United States Patent
Kang et al.

(10) Patent No.: US 9,646,543 B2
(45) Date of Patent: May 9, 2017

(54) DISPLAY DEVICE INCLUDING LINE LIGHT SOURCE AND METHOD OF DRIVING THE SAME

(71) Applicant: LG Display Co., Ltd., Seoul (KR)

(72) Inventors: Hoon Kang, Gyeonggi-do (KR); Jung-Eun Son, Gyeonggi-do (KR); Joo-Bong Hyun, Seoul (KR); Jee-Hwan Oh, Seoul (KR)

(73) Assignee: LG Display Co., Ltd., Seoul (KR)

( * ) Notice: Subject to any disclaimer, the term of this patent is extended or adjusted under 35 U.S.C. 154(b) by 71 days.

(21) Appl. No.: 14/078,739

(22) Filed: Nov. 13, 2013

(65) Prior Publication Data
US 2014/0146091 A1    May 29, 2014

(30) Foreign Application Priority Data
Nov. 26, 2012  (KR) .......................... 10-2012-0134816

(51) Int. Cl.
*G09G 3/34* (2006.01)
*G09G 3/36* (2006.01)
(Continued)

(52) U.S. Cl.
CPC ......... *G09G 3/3406* (2013.01); *G02B 26/005* (2013.01); *G02B 27/26* (2013.01);
(Continued)

(58) Field of Classification Search
CPC ... G09G 3/34; G09G 3/36; G09G 5/10; G02B 3/00; H04N 13/04
See application file for complete search history.

(56) References Cited

U.S. PATENT DOCUMENTS

| 7,548,670 B2* | 6/2009 | Ijzerman | G02B 6/0048 |
| | | | 359/443 |
| 2004/0263967 A1* | 12/2004 | Kwon | G02B 3/0031 |
| | | | 359/456 |

(Continued)

FOREIGN PATENT DOCUMENTS

| CN | 101840073 A | 9/2010 |
| CN | 102466178 A | 5/2012 |

(Continued)

OTHER PUBLICATIONS

Communication from the European Patent Office dated Feb. 26, 2014 in a counterpart European application No. 13191331.1-1902.

(Continued)

*Primary Examiner* — Amr Awad
*Assistant Examiner* — Wing Chow
(74) *Attorney, Agent, or Firm* — Morgan, Lewis & Bockius LLP

(57) ABSTRACT

A display device includes: a display panel for displaying an image toward a plurality of viewing zones; a light guide plate under the display panel; a lens array disposed along a side of the light guide plate, the lens array including a plurality of lenses; a light source part including a plurality of line light sources each emitting a ray toward the lens array; a position sensing unit for obtaining a position information about the plurality of viewing zones; and a control unit for controlling the display panel, the light source part and the position sensing unit according to the position information.

21 Claims, 21 Drawing Sheets

(51) Int. Cl.
  *G02B 3/00* (2006.01)
  *H04N 13/04* (2006.01)
  *G02B 26/00* (2006.01)
  *G02B 27/26* (2006.01)

(52) U.S. Cl.
  CPC ............ *G09G 3/36* (2013.01); *H04N 13/0404* (2013.01); *H04N 13/0411* (2013.01); *H04N 13/0468* (2013.01)

(56) References Cited

U.S. PATENT DOCUMENTS

| | | | |
|---|---|---|---|
| 2006/0192746 A1 | 8/2006 | Ioki et al. | |
| 2006/0274551 A1* | 12/2006 | Takada ................. | G02B 6/0055 362/611 |
| 2007/0024772 A1* | 2/2007 | Childers et al. ................. | 349/68 |
| 2008/0137328 A1* | 6/2008 | Lee et al. ..................... | 362/224 |
| 2008/0225205 A1* | 9/2008 | Travis ................. | G02B 6/0053 349/65 |
| 2008/0316302 A1 | 12/2008 | Vos et al. | |
| 2010/0097449 A1 | 4/2010 | Jeong et al. | |
| 2010/0157026 A1 | 6/2010 | Reichelt | |
| 2010/0225611 A1* | 9/2010 | Lee ....................... | G06F 3/0412 345/174 |
| 2010/0238097 A1 | 9/2010 | Baik et al. | |
| 2011/0187764 A1 | 8/2011 | Bae et al. | |
| 2011/0310232 A1 | 12/2011 | Wilson et al. | |
| 2012/0113358 A1 | 5/2012 | Kashiwagi et al. | |
| 2012/0243207 A1* | 9/2012 | Wang et al. ................. | 362/97.1 |
| 2012/0287037 A1 | 11/2012 | Shikii et al. | |
| 2013/0217161 A1* | 8/2013 | Hsu ..................... | H01L 25/0753 438/29 |

FOREIGN PATENT DOCUMENTS

| | | |
|---|---|---|
| JP | 2006-234916 A | 9/2006 |
| JP | 2010-224129 A | 10/2010 |
| JP | 2011-107589 A | 6/2011 |
| KR | 10-2010-0042954 A | 4/2010 |
| TW | 200916831 A | 4/2009 |
| WO | 2005/101855 A1 | 10/2005 |
| WO | 2008/142156 A2 | 11/2008 |
| WO | 2012/066778 A1 | 5/2012 |

OTHER PUBLICATIONS

Japanese Office Action dated Aug. 26, 2014 for corresponding Japanese Patent Application No. 2013-206212.
The First Office Action dated Jan. 26, 2016, from the State Intellectual Property Office of the People's Republic of China in a counterpart Chinese application No. 201310607142.X.

* cited by examiner

DISPLAY DEVICE INCLUDING LINE LIGHT SOURCE AND METHOD OF DRIVING THE SAME

CROSS REFERENCE TO RELATED APPLICATIONS

The present application claims the benefit of priority of Korean Patent Application No. 10-2012-0134816 filed in the Republic of Korea on Nov. 26, 2012, which is hereby incorporated by reference in its entirety.

FIELD OF THE DISCLOSURE

The present disclosure relates to a display device. The present disclosure also relates to a display device including a line light source driven in time division and a method of driving the display device.

DISCUSSION OF THE RELATED ART

In general, a display device for displaying an image includes a display panel to which an image signal is directly inputted and a driving unit which drives the display panel. The display panel includes a plurality of pixels arranged in matrix of two dimensions and the plurality of pixels display a plurality of unit images. A single image is displayed by combining the plurality of unit images.

Recently, a display device which forms viewing zones has been researched and developed by disposing a barrier or a lens between a display panel and a user. A different pixel of the display device is shown to the user according to a viewing angle. The display device may display different images at the viewing zones by inputting different image signals to the pixels corresponding to the viewing zones.

The structure of the display device may be illustrated with reference to a drawing. FIG. 1 is a cross-sectional view showing a lenticular lens type display device according to the related art. In FIG. 1, a lenticular lens type display device 10 includes a display panel 20 displaying an image and a lenticular lens 30 disposed over the display panel 20. The display panel 20 includes first to sixth pixels P1 to P6. A first image signal is inputted to the first, third and fifth pixels P1, P3 and P5, and a second image signal is inputted to the second, fourth and sixth pixels P2, P4 and P6.

The lenticular lens 30 includes a plurality of lenses 32 each having a semi-cylindrical shape and selectively refracting a light outputted from the first to sixth pixels P1 to P6. The plurality of lenses 32 are contiguously arranged in a stripe shape.

A first image IM1 from the first, third and fifth pixels P1, P3 and P5 of the display panel 20 is displayed at a first viewing zone VZ1 through the plurality of lenses 32 of the lenticular lens 30, and a second image IM2 from the second, fourth and sixth pixels P2, P4 and P6 of the display panel 20 is displayed at a second viewing zone VZ2 through the plurality of lenses 32 of the lenticular lens 30.

The lenticular lens type display device 10 may be used as a three-dimensional image display device by inputting left and right images as the first and second images IM1 and IM2, respectively, and by disposing left and right eyes of a user at the first and second viewing zones VZ1 and VZ2, respectively. The user may perceive a stereoscopic three-dimensional image by combining the left and right images.

In addition, the lenticular lens type display device 10 may be used as a multi-view display device by disposing users at the first and second viewing zones VZ1 and VZ2, respectively. The users may perceive different images.

In the lenticular lens type display device 10, since the first and second images IM1 and IM2 for the first and second viewing zones VZ1 and VZ2 are displayed by the single display panel 20 (space division), a resolution of each of the first and second images IM1 and IM2 is reduced as compared with a resolution of the display panel 20. The resolution is further reduced as the number of the viewing zones increases. For example, when the lenticular lens type display device 10 which includes the display panel 20 having a resolution of full high definition (FHD) (1920×1080) forms nine viewing zones, the image displayed at each of the nine viewing zone may have a reduced resolution of video graphics array (VGA) (640×480).

In addition, since the user at a specific position may perceive the image by a part of the pixels of the display panel 20 covered with the plurality of lenses 32, a display quality of the image may depend on a position relation between the lens 32 and the pixel. However, since the plurality of lenses 32 are formed as a film type, the plurality of lenses 32 are influenced by the temperature and the humidity and it is too hard to adjust a width W of each of the plurality of lenses 32. As a result, the image of a high display quality is not shown to the user at the specific position.

SUMMARY OF THE INVENTION

Accordingly, embodiments of the present invention are directed to a method of driving a dual mode liquid crystal display device that substantially obviates one or more of the problems due to limitations and disadvantages of the related art.

An object of the present disclosure is to provide a display device for displaying a two-dimensional image and a three-dimensional image without reduction in resolution by using an edge type backlight unit including a line light source and a lens array and by driving the edge type backlight unit and a display panel in time division and a method of driving the display device.

Another object of the present disclosure is to provide a display device where the number of light sources is reduced by using an edge type backlight unit including a few line light sources and a method of driving the display device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages, as embodied and broadly described herein, there is provided a display device including: a display panel for displaying a plurality of images at a plurality of viewing zones in time division; a light guide plate under the display panel; a lens array disposed along a side of the light guide plate, the lens array including a plurality of lenses; a light source part including a plurality of line light sources each emitting a ray toward the lens array; a position sensing unit for obtaining a position information about the plurality of viewing zones; and a control unit for controlling the display panel, the light source part and the position sensing unit according to the position information.

In another aspect, there is provided a method of driving a display device including: obtaining a position information about a plurality of viewing zones by a position sensing unit;

controlling a light source part such that a ray emitted from a plurality of line light sources of the light source part passes through a lens array and a light guide plate and is sequentially transmitted to the plurality of viewing zones; and displaying a plurality of images at the plurality of viewing zones in time division by a display panel using the ray.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments, examples of which are illustrated in the accompanying drawings.

Figure 1:
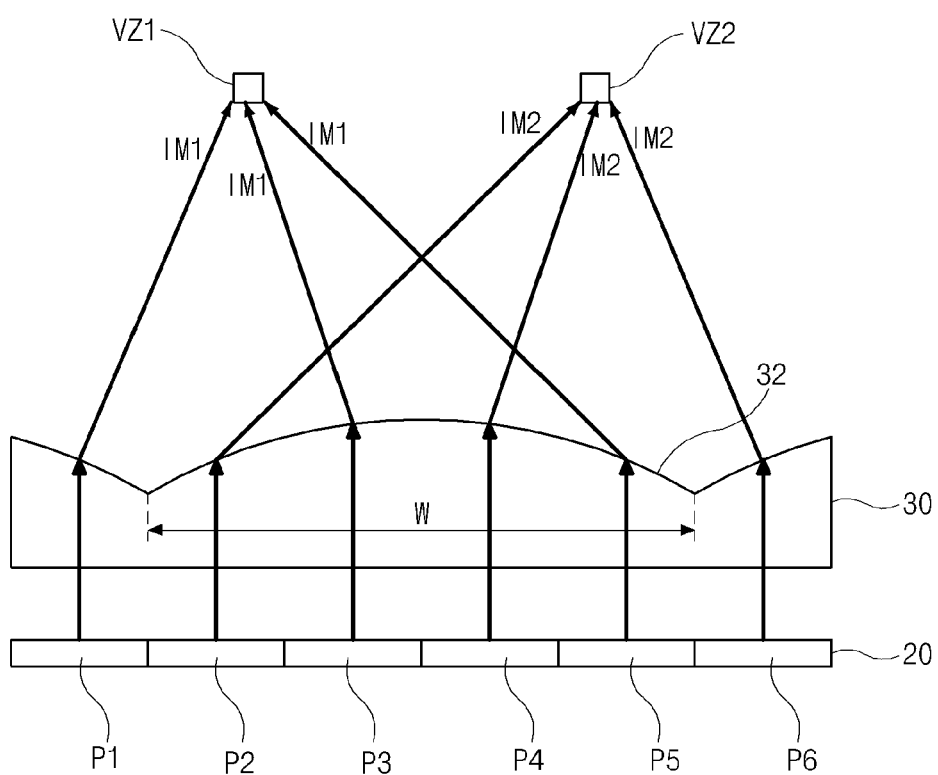
FIG. 1 is a cross-sectional view showing a lenticular lens type display device according to the related art.
Figure 2A:
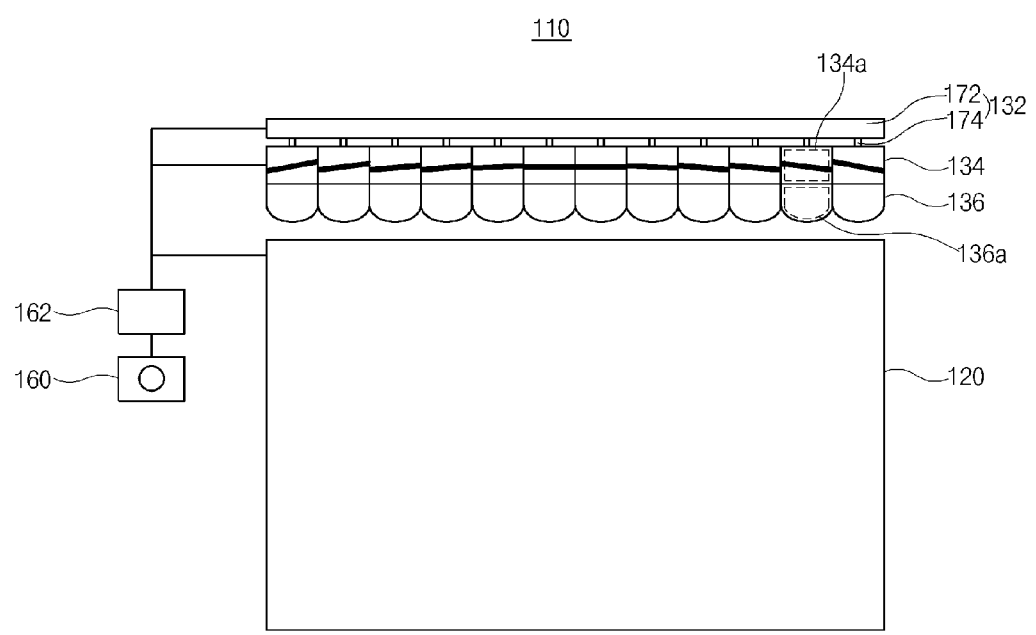
FIGS. 2A and 2B are a plan view and a cross-sectional view, respectively, showing a display device including a line light source according to a first embodiment of the present invention.
Figure 2B:
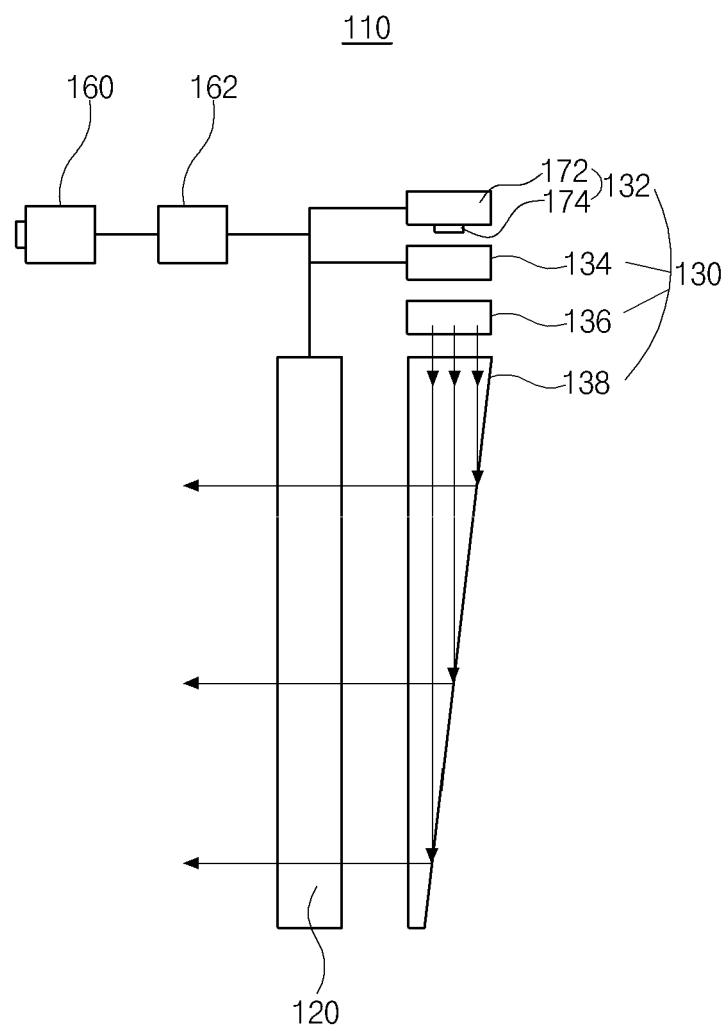

FIGS. 2A and 2B are a plan view and a cross-sectional view, respectively, showing a display device including a line light source according to a first embodiment of the present invention.

In FIGS. 2A and 2B, a display device 110 according to a first embodiment of the present invention includes a display panel 120 for displaying an image, a backlight unit 130 for supplying a light to the display panel 120, a position sensing unit 160 for detecting a position of a user and a control unit 162 for controlling the display panel 120, the backlight unit 130 and the position sensing unit 160.

The display panel 120 includes a plurality of pixels (not shown), and at least one image signal may be inputted to the plurality of pixels during each of a plurality of sub-frames obtained by dividing a single frame in time division. For example, a transmissive type liquid crystal panel which includes two substrates facing into each other and a liquid crystal layer between the two substrates may be used to configure the display panel 120.

The backlight unit 130 includes a light source part 132 for emitting a ray, a ray adjusting part 134 for adjusting a direction of the ray emitted from the light source part 132, a lens array 136 for collimating the ray from the ray adjusting part 134 and a light guide plate 138 for changing a direction of the ray from the lens array 136 toward the display panel 120. The light source part 132, the ray adjusting part 134 and the lens array 136 are disposed along a side of the light guide plate 138 and the light guide plate 138 is disposed under the display panel 120.

The light source part 132 includes a base substrate 172 and a plurality of line light sources 174 spaced apart from each other and mounted in a row on the base substrate 172. For example, a light emitting diode (LED), an organic light emitting diode (OLED) or a laser which emits a light toward a single direction may be used to configure the plurality of line light sources 174.

The ray adjusting part 134 includes a plurality of electrowetting devices 134a. The structure of each of the plurality of electrowetting devices 134a will be illustrated with reference to FIGS. 3A and 3B.

The lens array 136 includes a plurality of lenses 136a contiguously arranged and each of the plurality of lenses 136a has a semi-cylindrical shape. The plurality of line light sources 174, the plurality of electrowetting devices 134a and the plurality of lenses 136a may have a ratio of 1:1:1 correspondence.

The light guide plate 138 is disposed such that an incident surface of the light guide plate 138 faces the lens array 136. The light guide plate 138 supplies a uniform linear ray to the display panel 120 by transmitting the ray from the lens array 136 due to several total reflections. For the purpose of perpendicularly changing the direction of the ray, the light guide plate 138 may have a front surface parallel to a horizontal surface and a rear surface slanted with respect to the horizontal surface, and a pattern having a predetermined shape may be formed on the rear surface of the light guide plate 138. For example, an elliptical pattern, a polygon pattern or a hologram pattern may be formed on the rear surface of the light guide plate 138, and the pattern may be formed by a printing method or a molding method.

The position sensing unit 160 obtains position information about a target position which a user or one of left and light eyes of the user is disposed in and the image of the display panel 120 is directed to. For example, a camera may be used to configure the position sensing unit 160.

The control unit 162 determines a kind of the image, a refraction degree of the ray and an emission timing of the ray according to the position information about the target position from the position sensing unit 160 and drives the display panel 120, the light source part 132 and the ray adjusting part 134 according to contents of determination.

The control unit 162 may drive the plurality of line light sources 174 of the light source part 132 to emit the ray at a determined timing, may drive the plurality of electrowetting devices 134a of the ray adjusting part 134 to refract the ray with a determined angle, and may drive the display panel 120 to display a determined image. As a result, the determined image is transmitted to the user or one of the left and right eyes of the user in the target position at the determined timing.

Figure 3A:
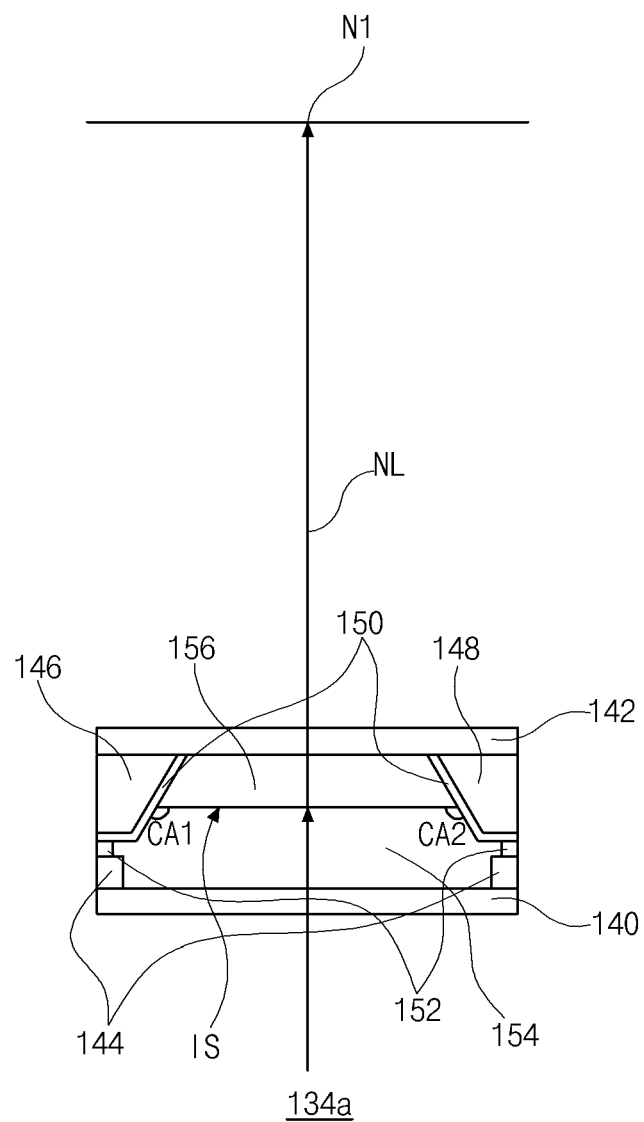
FIGS. 3A and 3B are views showing an electrowetting device of a display device according to a first embodiment of the present invention.
Figure 3B:
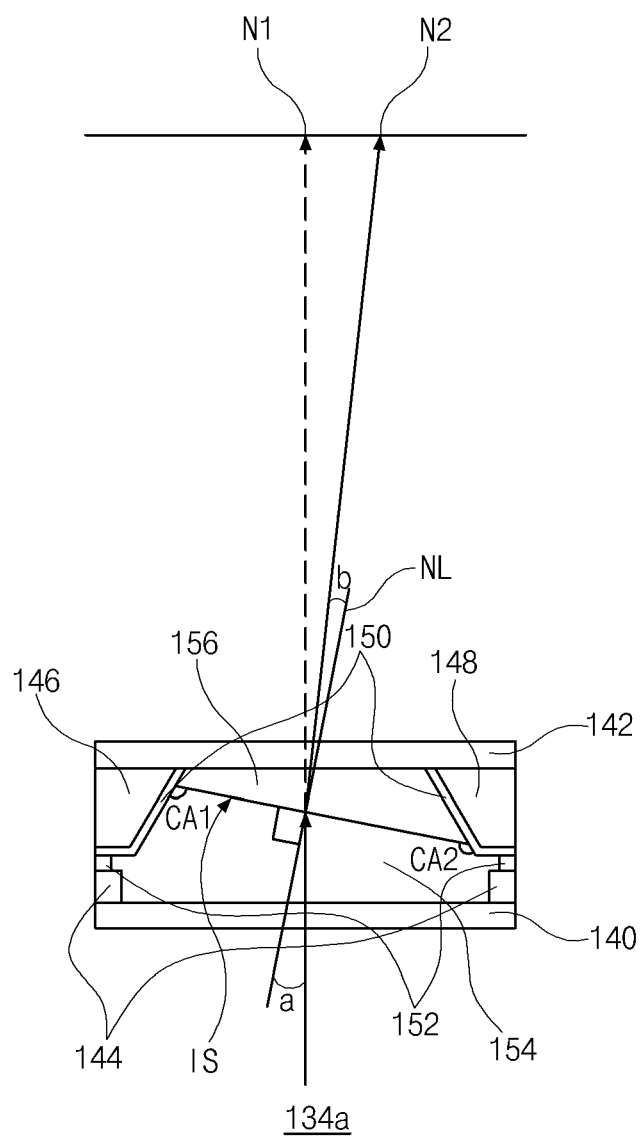

FIGS. 3A and 3B are views showing an electrowetting device of a display device according to a first embodiment of the present invention. FIG. 3A shows the electrowetting device when the perpendicularly incident light is not refracted by the electrowetting device, and FIG. 3B shows the electrowetting device when the perpendicularly incident light is refracted by the electrowetting device.

In FIGS. 3A and 3B, the electrowetting device 134a includes first and second substrates 140 and 142 facing and spaced apart from each other. A first electrode 144 is formed in end portions of an inner surface of the first substrate 140, and second and third electrodes 146 and 148 are formed in end portions, respectively, of an inner surface of the second substrate 142. Each of the second and third electrodes 146 and 148 may have a cross-section of a trapezoid shape which has a slant inner side. Accordingly, slant side surfaces of the second and third electrodes 146 and 148 face into each other. Further, each of the slant side surfaces of the second and third electrodes 146 and 148 may have an area greater than an area of each of top surfaces of the second and third electrodes 146 and 148.

A first insulating layer 150 of a hydrophobic insulating material is formed on the slant side surfaces and the top surfaces of the second and third electrodes 146 and 148, and a second insulating layer 152 is formed between the first insulating layer 150 on the top surfaces of the second and third electrodes 146 and 148 and the first electrode 144.

In addition, a water layer 154 and an oil layer 156 are formed in a space constituted by the first and second substrates 140 and 142 and the first to third electrodes 144, 146 and 148.

The electrowetting device 134a changes the direction of the incident ray by changing a direction of an interface surface between the water layer 154 and the oil layer 156 due to voltages applied to the first to third electrodes 144, 146 and 148.

In FIG. 3A, when no voltage is applied to the first to third electrodes 144m 146 and 148 of the electrowetting device 134a or when equal voltages are applied to the second and third electrodes 146 and 148, a first contact angle CA1 made by the oil layer 156 and the second electrode 146 and a second contact angle CA2 made by the oil layer 156 and the third electrode 148 are the same as each other (CA1=CA2). As a result, an interface surface IS between the water layer 154 and the oil layer 156 is formed to be parallel to the inner surfaces of the first and second substrate 140 and 142, thereby formed to be parallel to the incident surface of the light guide plate 138 (of FIG. 2B).

For example, when a first voltage V1 is applied to the first electrode 144 and second and third voltages V2 and V3 greater than the first voltage V1 and the same as each other (V2=V3>V1) are applied to the second and third electrodes 146 and 148, respectively, the interface surface IS between the water layer 154 and the oil layer 146 is formed to be parallel to the incident surface of the light guide plate 138.

Since the ray which is perpendicularly incident to the first substrate 140 of the plurality of electrowetting devices 134a of the ray adjusting part 134 (of FIG. 2B) from the plurality of line light sources 174 of the light source part 132 has an incident angle of about 0 degree with respect to a normal line NL perpendicular to the interface surface IS between the water layer 154 and the oil layer 156, the ray is not refracted at the interface surface IS and is emitted along the normal line NL to reach a first point N1.

In FIG. 3B, when different voltages are applied to the second and third electrodes 146 and 148, the first contact angle CA1 made by the oil layer 156 and the second electrode 146 and the second contact angle CA2 made by the oil layer 156 and the third electrode 148 are different from each other (CA1≠CA2). As a result, the interface surface IS between the water layer 154 and the oil layer 156 is formed to be slanted with respect to the inner surfaces of the first and second substrate 140 and 142, thereby formed to be slanted to the incident surface of the light guide plate 138 (of FIG. 2B).

For example, when the first voltage V1 is applied to the first electrode 144, the second voltage V2 greater than the first voltage V1 is applied to the second electrode 146, and the third voltages V3 greater than the first voltage V1 and smaller than the second voltage V2 (V2>V3>V1) is applied to the third electrode 148, the interface surface IS between the water layer 154 and the oil layer 146 is formed to be slanted with respect to the incident surface of the light guide plate 138.

Since the ray which is perpendicularly incident to the first substrate 140 of the plurality of electrowetting devices 134a of the ray adjusting part 134 (of FIG. 2B) from the plurality of line light sources 174 of the light source part 132 has an incident angle a other than about 0 degree with respect to the normal line NL perpendicular to the interface surface IS between the water layer 154 and the oil layer 156, the ray is refracted at the interface surface IS according to Snell's law which describes the relationship among the refractive indexes of the water layer 154 and the oil layer 156, the incident angle and the refractive angle and is emitted with an exit angle b with respect to the normal line NL to reach a second point N2 spaced apart from the first point N1.

In the plurality of electrowetting devices 134a of the ray adjusting part 134 of the display device 110 according to the first embodiment of the present invention, the direction of the ray emitted from the plurality of line light sources 174 of the light source part 132 is adjusted by changing the first, second and third voltages V1, V2 and V3 applied to the first, second and third electrodes 144, 146 and 148, respectively. The first voltage V1 may be a ground voltage, and each of the second and third voltages V2 and V3 may be a positive voltage.

The display device 110 according to the first embodiment of the present invention may be driven in various modes such as a two-dimensional mode, a three-dimensional mode and a multi-view mode by adjusting the direction of the ray with the ray adjusting part 134 and by displaying the image of the display panel 120 in time division.

Figure 4A:
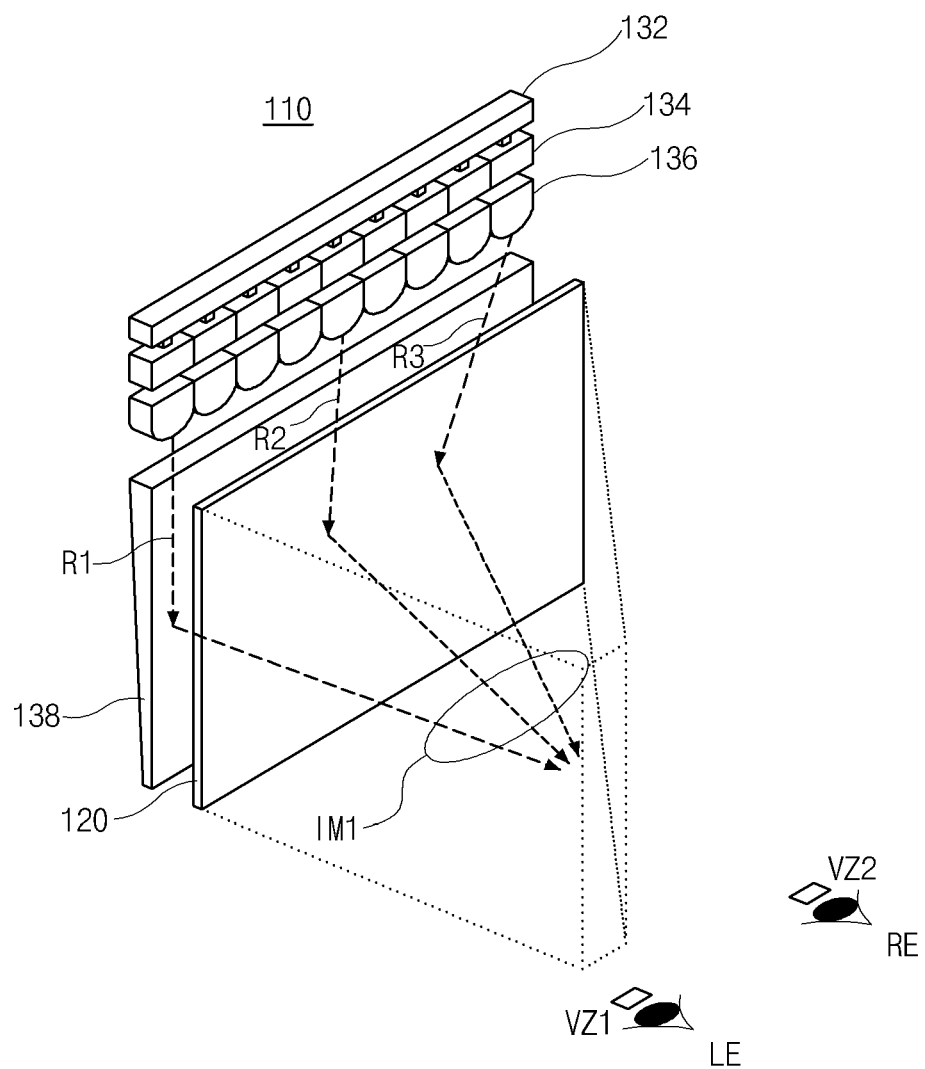
FIGS. 4A and 4B are perspective views showing a two-dimensional mode operation of a display device according to a first embodiment of the present invention.
Figure 4B:
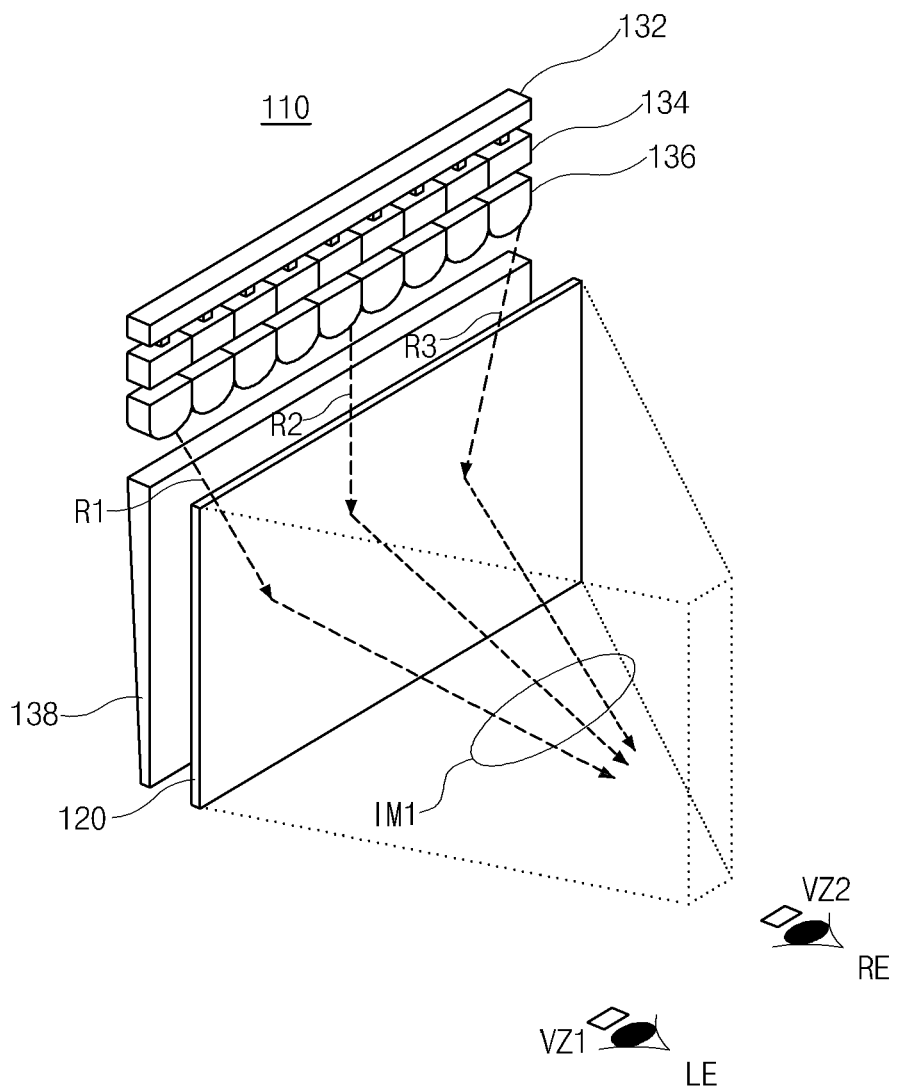

FIGS. 4A and 4B are perspective views showing a two-dimensional mode operation of a display device according to a first embodiment of the present invention. FIG. 4A shows the operation of the display device during a first sub-frame which is a former half frame of a single frame, and FIG. 4B shows the operation of the display device during a second sub-frame which is a latter half frame of the single frame.

In FIG. 4A, during the first sub-frame of the display device 110 driven in the two-dimensional mode, the rays emitted from the plurality of line light sources 174 (of FIG. 2B) of the light source part 132 pass through the plurality of electrowetting devices 134a of the ray adjusting part 134 and the plurality of lenses 136a of the lens array 136 to be collimated and enter the light guide plate 138 with different incident angles. The light guide plate 138 changes directions of the rays toward the display panel 120 and the rays are transmitted to a first viewing zone VZ1 corresponding to a left eye LE of a user.

For example, a first ray R1 emitted from a left portion of the plurality of line light sources 174 may pass through the plurality of electrowetting devices 134a without refraction and may be transmitted to the first viewing zone VZ1 through the plurality of lenses 136a and the light guide plate 138. In addition, a second ray R2 emitted from a central portion of the plurality of line light sources 174 may be refracted left by the plurality of electrowetting devices 134a and may be transmitted to the first viewing zone VZ1 through the plurality of lenses 136a and the light guide plate 138, and a third ray R3 emitted from a right portion of the plurality of line light sources 174 may be refracted further left by the plurality of electrowetting devices 134a as compared with the second ray R2 and may be transmitted to the first viewing zone VZ1 through the plurality of lenses 136a and the light guide plate 138. Accordingly, during the first sub-frame, the display panel 120 may display a first image IM1 and the user may perceive the first image IM1 by the left eye LE.

In FIG. 4B, during the second sub-frame of the display device 110 driven in the two-dimensional mode, the rays emitted from the plurality of line light sources 174 (of FIG. 2B) of the light source part 132 pass through the plurality of electrowetting devices 134a of the ray adjusting part 134 and the plurality of lenses 136a of the lens array 136 to be collimated and enter the light guide plate 138 with different incident angles. The light guide plate 138 changes directions of the rays toward the display panel 120 and the rays are transmitted to a second viewing zone VZ2 corresponding to a right eye RE of the user.

For example, the first ray R1 emitted from the left portion of the plurality of line light sources 174 may be refracted right by the plurality of electrowetting devices 134a and may be transmitted to the second viewing zone VZ2 through the plurality of lenses 136a and the light guide plate 138. In addition, the second ray R2 emitted from the central portion of the plurality of line light sources 174 may pass through the plurality of electrowetting devices 134a without refraction and may be transmitted to the second viewing zone VZ2 through the plurality of lenses 136a and the light guide plate 138, and the third ray R3 emitted from the right portion of the plurality of line light sources 174 may be refracted left by the plurality of electrowetting devices 134a and may be transmitted to the second viewing zone VZ2 through the plurality of lenses 136a and the light guide plate 138. Accordingly, during the second sub-frame, the display panel 120 may display the first image IM1 and the user may perceive the first image IM1 by the right eye RE.

In the display device 110 driven in the two-dimensional mode, since the first image IM1 is transmitted to the left eye LE of the user during the first sub-frame and the first image IM1 is transmitted to the right eye RE of the user during the second sub-frame, the user may perceive a two-dimensional image.

For example, a distance between the first and second viewing zones VZ1 and VZ2 may correspond to about 65 mm of a binocular disparity. When the display device 110 is driven with a frequency of about 120 Hz, the single frame may be about 16.7 msec and each of the first and second sub-frames may be about 8.3 msec which is a half of the single frame. In addition, when the display device 110 is driven with a frequency of about 240 Hz, the single frame may be about 16.7 msec and each of the first to fourth sub-frames may be about 4.2 msec which is a quarter of the single frame.

When the display device 110 is driven in the two-dimensional mode, the position sensing unit 160 (of FIG. 2B) may obtain position information of the left and right eyes LE and RE of the user, and the control unit 162 (of FIG. 2B) may drive the display panel 120, the light source part 132 and the ray adjusting part 134 according to the position information from the position sensing unit 160 so that the first image IM1 can be transmitted to one of the left and right eyes LE and RE of the user. Since the others except the user corresponding to the position information may not perceive the two-dimensional image, the display device 110 driven in the two-dimensional mode may be used as a monitor of an equipment such as an automated teller machine (ATM) for displaying personal information.

In another embodiment, the first image IM1 may be transmitted to the left and right eyes LE and RE of the user at the same time during a whole single frame by enlarging a width of the ray. Since the width of the ray is enlarged, the ray may cover the left and right eyes LE and RE together and the direction of the ray may not be changed during the whole single frame.

Figure 5A:
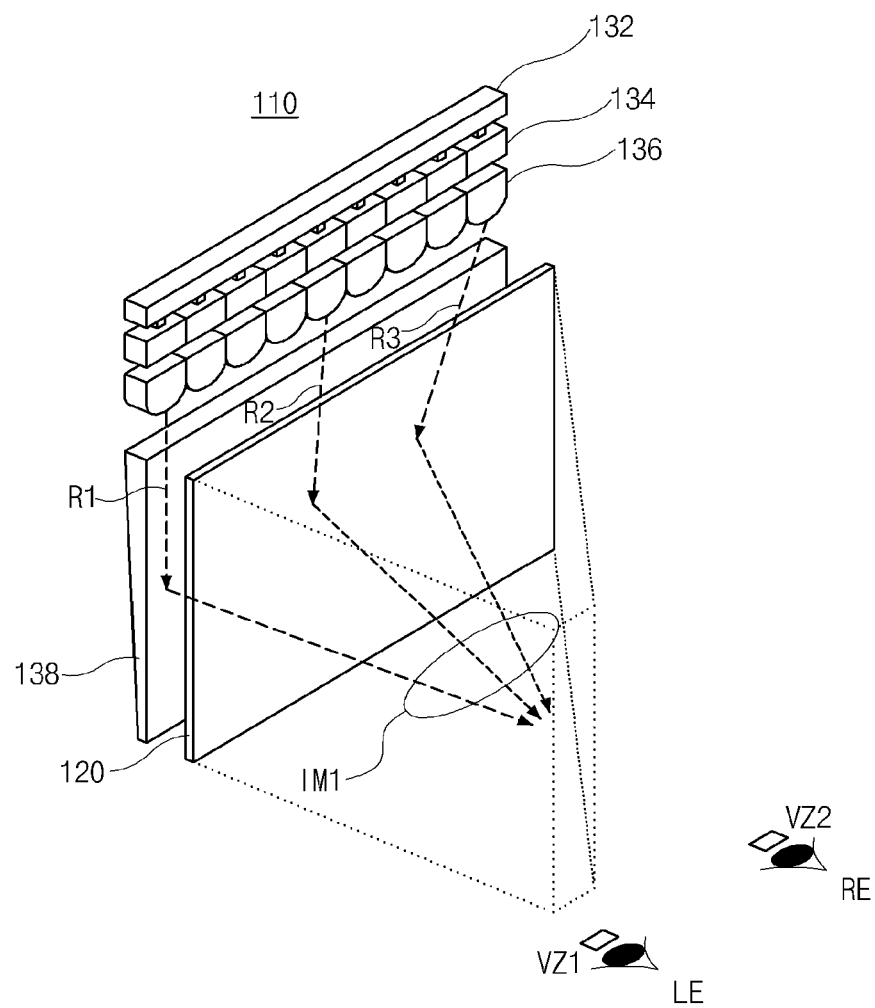
FIGS. 5A and 5B are perspective views showing a three-dimensional mode operation of a display device according to a first embodiment of the present invention.
Figure 5B:
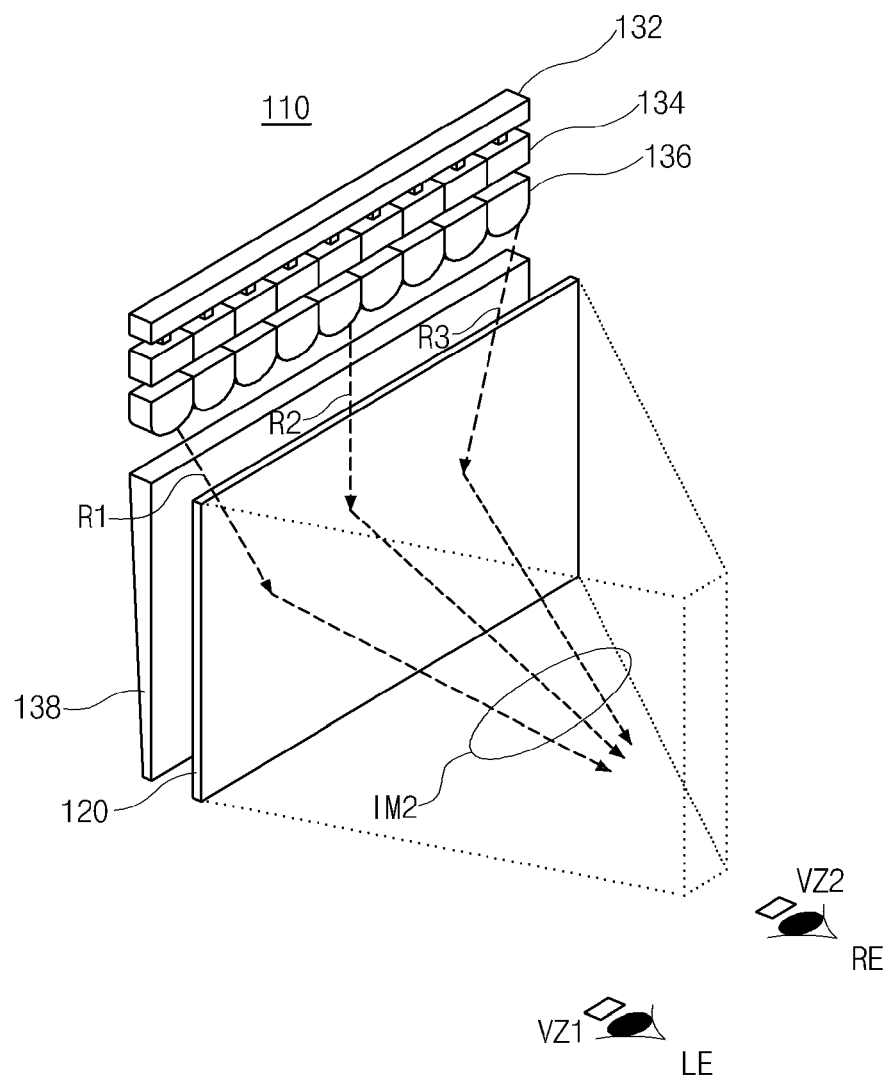

FIGS. 5A and 5B are perspective views showing a three-dimensional mode operation of a display device according to a first embodiment of the present invention. FIG. 5A shows the operation of the display device during a first sub-frame which is a former half frame of a single frame, and FIG. 5B shows the operation of the display device during a second sub-frame which is a latter half frame of the single frame.

In FIG. 5A, during the first sub-frame of the display device 110 driven in the three-dimensional mode, the rays emitted from the plurality of line light sources 174 (of FIG. 2B) of the light source part 132 pass through the plurality of electrowetting devices 134a of the ray adjusting part 134 and the plurality of lenses 136a of the lens array 136 to be collimated and enter the light guide plate 138 with different incident angles. The light guide plate 138 changes directions of the rays toward the display panel 120 and the rays are transmitted to a first viewing zone VZ1 corresponding to a left eye LE of a user.

For example, a first ray R1 emitted from a left portion of the plurality of line light sources 174 may pass through the plurality of electrowetting devices 134a without refraction and may be transmitted to the first viewing zone VZ1 through the plurality of lenses 136a and the light guide plate 138. In addition, a second ray R2 emitted from a central portion of the plurality of line light sources 174 may be refracted left by the plurality of electrowetting devices 134a and may be transmitted to the first viewing zone VZ1 through the plurality of lenses 136a and the light guide plate 138, and a third ray R3 emitted from a right portion of the plurality of line light sources 174 may be refracted further left by the plurality of electrowetting devices 134a as compared with the second ray R2 and may be transmitted to the first viewing zone VZ1 through the plurality of lenses 136a and the light guide plate 138. Accordingly, during the first sub-frame, the display panel 120 may display a first image IM1 and the user may perceive the first image IM1 by the left eye LE.

In FIG. 5B, during the second sub-frame of the display device 110 driven in the three-dimensional mode, the rays emitted from the plurality of line light sources 174 (of FIG. 2B) of the light source part 132 pass through the plurality of electrowetting devices 134a of the ray adjusting part 134 and the plurality of lenses 136a of the lens array 136 to be collimated and enter the light guide plate 138 with different incident angles. The light guide plate 138 changes directions of the rays toward the display panel 120 and the rays are transmitted to a second viewing zone VZ2 corresponding to a right eye RE of the user.

For example, the first ray R1 emitted from the left portion of the plurality of line light sources 174 may be refracted right by the plurality of electrowetting devices 134a and may be transmitted to the second viewing zone VZ2 through the plurality of lenses 136a and the light guide plate 138. In addition, the second ray R2 emitted from the central portion of the plurality of line light sources 174 may pass through the plurality of electrowetting devices 134a without refraction and may be transmitted to the second viewing zone VZ2 through the plurality of lenses 136a and the light guide plate 138, and the third ray R3 emitted from the right portion of the plurality of line light sources 174 may be refracted left by the plurality of electrowetting devices 134a and may be transmitted to the second viewing zone VZ2 through the plurality of lenses 136a and the light guide plate 138. Accordingly, during the second sub-frame, the display panel 120 may display a second image IM2 and the user may perceive the second image IM2 by the right eye RE.

In the display device 110 driven in the three-dimensional mode, since the first image IM1 of a left eye image is transmitted to the left eye LE of the user during the first sub-frame and the second image IM2 of a right eye image is transmitted to the right eye RE of the user during the second sub-frame, the user may perceive a three-dimensional image by combining the first and second images IM1 and IM2.

For example, a distance between the first and second viewing zones VZ1 and VZ2 may correspond to about 65 mm of a binocular disparity. When the display device 110 is driven with a frequency of about 120 Hz, the single frame may be about 16.7 msec and each of the first and second sub-frames may be about 8.3 msec which is a half of the single frame. In addition, when the display device 110 is driven with a frequency of about 240 Hz, the single frame may be about 16.7 msec and each of the first to fourth sub-frames may be about 4.2 msec which is a quarter of the single frame.

When the display device 110 is driven in the three-dimensional mode, the position sensing unit 160 (of FIG. 2B) may obtain position information of the left and right eyes LE and RE of the user, and the control unit 162 (of FIG. 2B) may drive the display panel 120, the light source part 132 and the ray adjusting part 134 according to the position information from the position sensing unit 160 so that the first and second images IM1 and IM2 can be transmitted to the left and right eyes LE and RE, respectively, of the user. Since the others except the user corresponding to the position information may not perceive the three-dimensional image, the display device 110 driven in the three-dimensional mode may be used as a monitor of an equipment such as an automated teller machine (ATM) for displaying personal information.

Figure 6A:
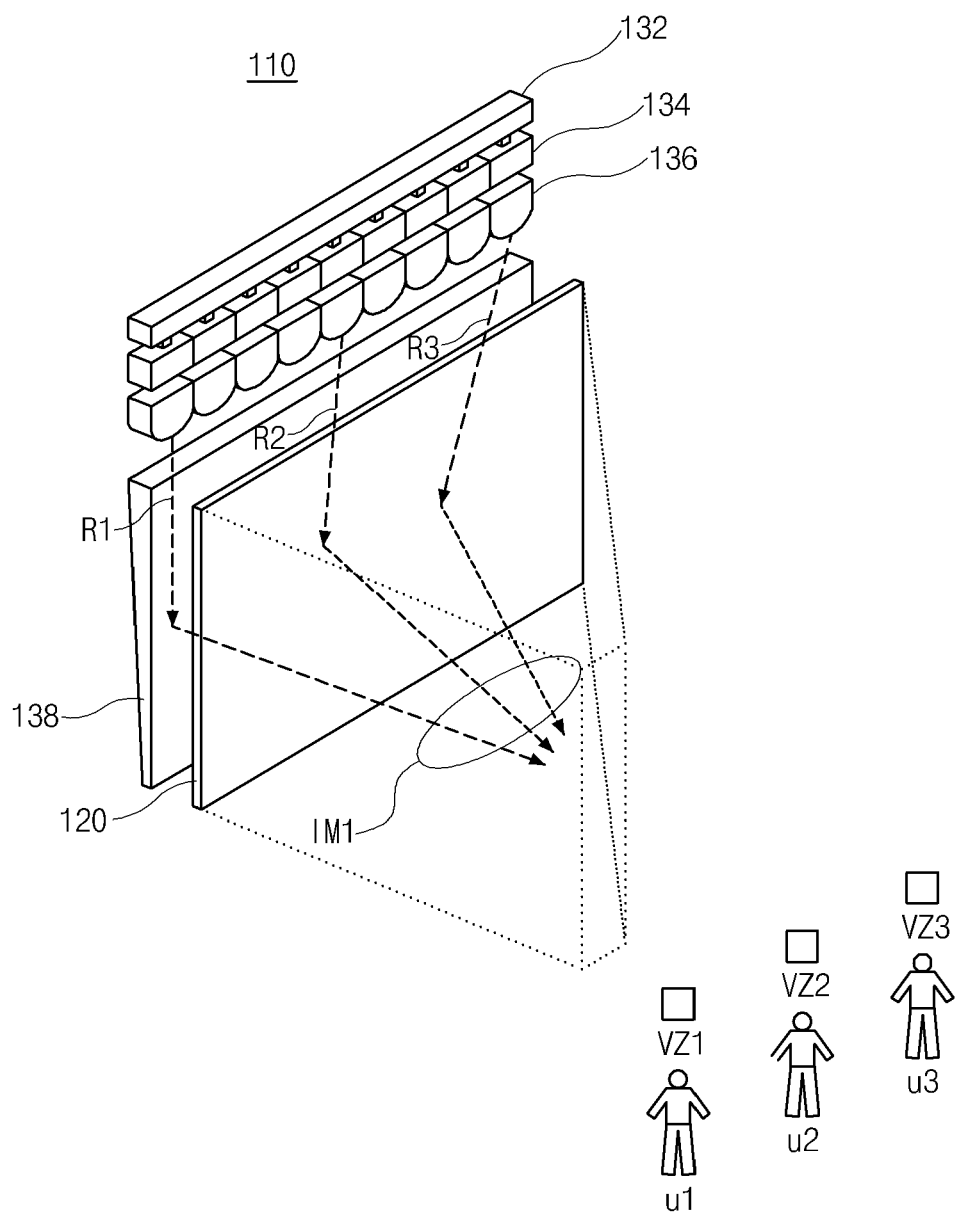
FIGS. 6A, 6B and 6C are perspective views showing a multi-view mode operation of a display device according to a first embodiment of the present invention.
Figure 6B:
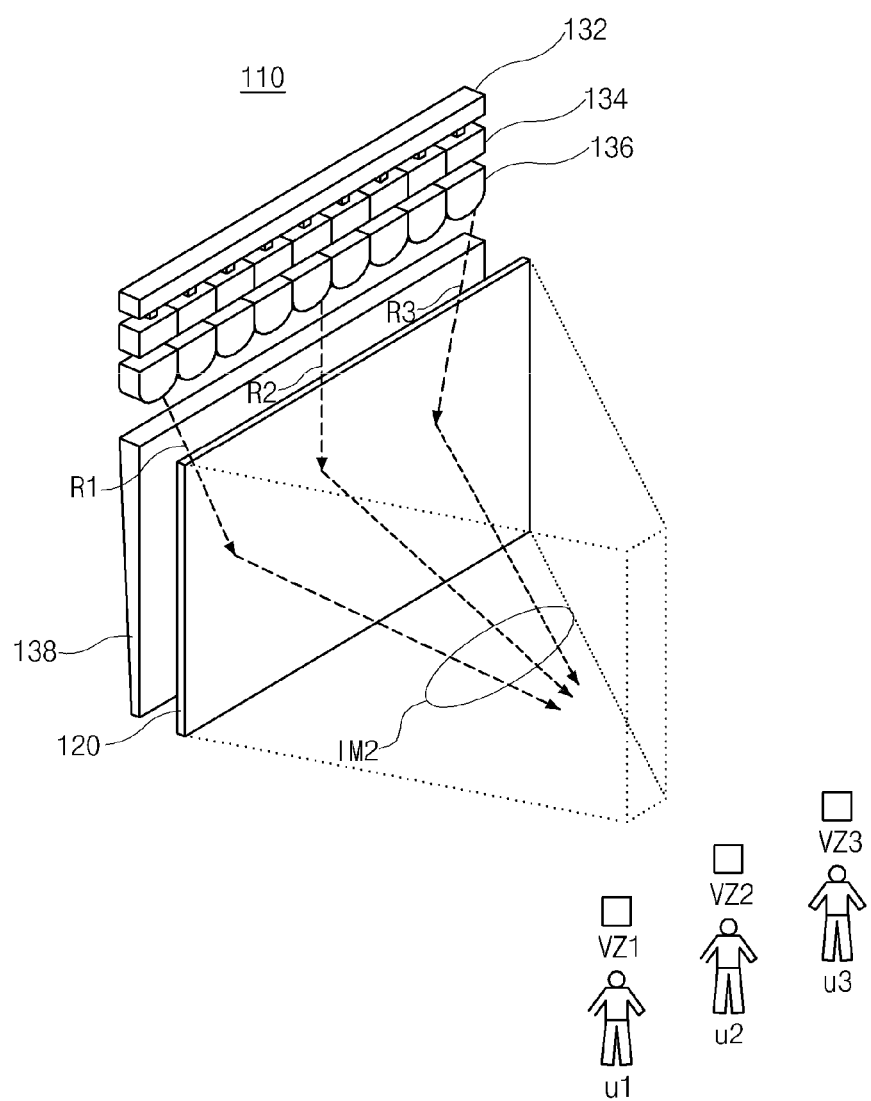
Figure 6C:
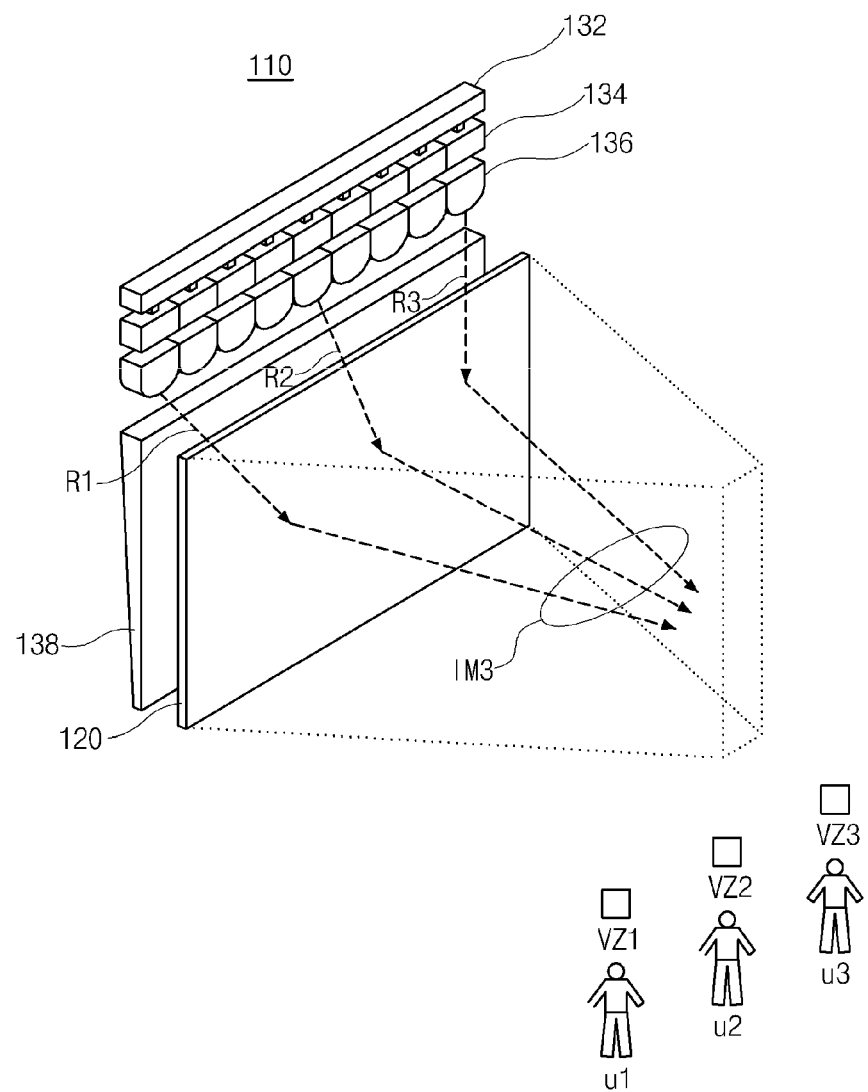

FIGS. 6A, 6B and 6C are perspective views showing a multi-view mode operation of a display device according to a first embodiment of the present invention. FIGS. 6A, 6B and 6C show the operation of the display device during first, second and third sub-frames, respectively, which constitute a single frame.

In FIG. 6A, during the first sub-frame of the display device 110 driven in the multi-view mode, the rays emitted from the plurality of line light sources 174 (of FIG. 2B) of the light source part 132 pass through the plurality of electrowetting devices 134a of the ray adjusting part 134 and the plurality of lenses 136a of the lens array 136 to be collimated and enter the light guide plate 138 with different incident angles. The light guide plate 138 changes directions of the rays toward the display panel 120 and the rays are transmitted to a first viewing zone VZ1 corresponding to a first user U1.

For example, a first ray R1 emitted from a left portion of the plurality of line light sources 174 may pass through the plurality of electrowetting devices 134a without refraction and may be transmitted to the first viewing zone VZ1 through the plurality of lenses 136a and the light guide plate 138. In addition, a second ray R2 emitted from a central portion of the plurality of line light sources 174 may be refracted left by the plurality of electrowetting devices 134a and may be transmitted to the first viewing zone VZ1 through the plurality of lenses 136a and the light guide plate 138, and a third ray R3 emitted from a right portion of the plurality of line light sources 174 may be refracted further left by the plurality of electrowetting devices 134a as compared with the second ray R2 and may be transmitted to the first viewing zone VZ1 through the plurality of lenses 136a and the light guide plate 138. Accordingly, during the first sub-frame, the display panel 120 may display a first image IM1 and the first user U1 may perceive the first image IM1.

In FIG. 6B, during the second sub-frame of the display device 110 driven in the multi-view mode, the rays emitted from the plurality of line light sources 174 (of FIG. 2B) of the light source part 132 pass through the plurality of electrowetting devices 134a of the ray adjusting part 134 and the plurality of lenses 136a of the lens array 136 to be collimated and enter the light guide plate 138 with different incident angles. The light guide plate 138 changes directions of the rays toward the display panel 120 and the rays are transmitted to a second viewing zone VZ2 corresponding to a second user U2.

For example, the first ray R1 emitted from the left portion of the plurality of line light sources 174 may be refracted right by the plurality of electrowetting devices 134a and may be transmitted to the second viewing zone VZ2 through the plurality of lenses 136a and the light guide plate 138. In addition, the second ray R2 emitted from the central portion of the plurality of line light sources 174 may pass through the plurality of electrowetting devices 134a without refraction and may be transmitted to the second viewing zone VZ2 through the plurality of lenses 136a and the light guide plate 138, and the third ray R3 emitted from the right portion of the plurality of line light sources 174 may be refracted left by the plurality of electrowetting devices 134a and may be transmitted to the second viewing zone VZ2 through the plurality of lenses 136a and the light guide plate 138. Accordingly, during the second sub-frame, the display panel 120 may display a second image IM1 and the second user U2 may perceive the second image IM2.

In FIG. 6C, during the third sub-frame of the display device 110 driven in the multi-view mode, the rays emitted from the plurality of line light sources 174 (of FIG. 2B) of the light source part 132 pass through the plurality of electrowetting devices 134a of the ray adjusting part 134 and the plurality of lenses 136a of the lens array 136 to be collimated and enter the light guide plate 138 with different incident angles. The light guide plate 138 changes directions of the rays toward the display panel 120 and the rays are transmitted to a third viewing zone VZ3 corresponding to a third user U3.

For example, the first ray R1 emitted from the left portion of the plurality of line light sources 174 may be refracted right by the plurality of electrowetting devices 134a and may be transmitted to the third viewing zone VZ3 through the plurality of lenses 136a and the light guide plate 138. In addition, the second ray R2 emitted from the central portion of the plurality of line light sources 174 may be refracted less right by the plurality of electrowetting devices 134a as compared with the first ray R1 and may be transmitted to the third viewing zone VZ3 through the plurality of lenses 136a and the light guide plate 138, and the third ray R3 emitted from the right portion of the plurality of line light sources 174 may pass through the plurality of electrowetting devices 134a and may be transmitted to the third viewing zone VZ3 through the plurality of lenses 136a and the light guide plate 138. Accordingly, during the third sub-frame, the display panel 120 may display a third image IM3 and the third user U3 may perceive the third image IM3.

In the display device 110 driven in the multi-view mode, the first image IM1 is transmitted to the first user U1 during the first sub-frame, the second image IM2 is transmitted to the second user U2 during the second sub-frame and the third image IM1 is transmitted to the third user U3 during the third sub-frame. As a result, the first, second and third users U1, U2 and U3 may perceive the first, second and third images IM1, IM2 and IM3, respectively.

For example, when the display device 110 is driven with a frequency of about 120 Hz, the single frame may be about 16.7 msec and each of the first, second and third sub-frames may be about 5.6 msec which is one third of the single frame. In addition, when the display device 110 is driven with a frequency of about 240 Hz, the single frame may be about 16.7 msec and each of the first to sixth sub-frames may be about 2.8 msec which is one sixth of the single frame.

When the display device 110 is driven in the multi-view mode, the position sensing unit 160 (of FIG. 2B) may obtain position information of the first, second and third users U1, U2 and U3, and the control unit 162 (of FIG. 2B) may drive the display panel 120, the light source part 132 and the ray adjusting part 134 according to the position information from the position sensing unit 160 so that the first, second and third images IM1, IM2 and IM3 can be transmitted to the first, second and third users U1, U2 and U3, respectively.

When the first to third images IM1, IM2 and IM3 are the same as each other in the display device 110 of the multi-view mode, the first to third users U1, U2 and U3 may perceive a single image. In addition, when the first to third images IM1, IM2 and IM3 are different from each other in the display device 110 of the multi-view mode, the first to third users U1, U2 and U3 may perceive respective images. Accordingly, a plurality of users may perceive different images using the single display device 110. For example, when the display device 110 according to the first embodiment of the present invention is used as a monitor of a game machine, a plurality of gamers may play a game with watching a game scene in their own viewpoints.

In addition, each of the first to third sub-frames may be divided into two and the rays corresponding to left and right images may be transmitted to left and right eyes, respectively, of each of the first to third users U1, U2 and U3 during the divided two of each of the first to third sub-frames. As a result, each of the first to third users U1, U2 and U3 may perceive a respective three-dimensional image.

When the display device 120 has a hold type such as a liquid crystal display (LCD) device, where a pixel emits a light continuously during a frame, a previous image of a previous frame may be displayed with a present image of a present frame during each sub-frame of the two-dimensional mode, the three-dimensional mode and the multi-view mode. Since the co-existence of the previous image and the present image causes a residual image, the plurality of line light sources 174 of the light source part 132 may be turned off to display a black while the previous image and the present image exist and may be turned on while the present image exists. As a result, the residual image may be prevented and the display device 110 may be driven in an impulsive type such as a cathode ray tube (CRT) device, where a pixel emits a light momentarily during a frame.

Figure 7A:
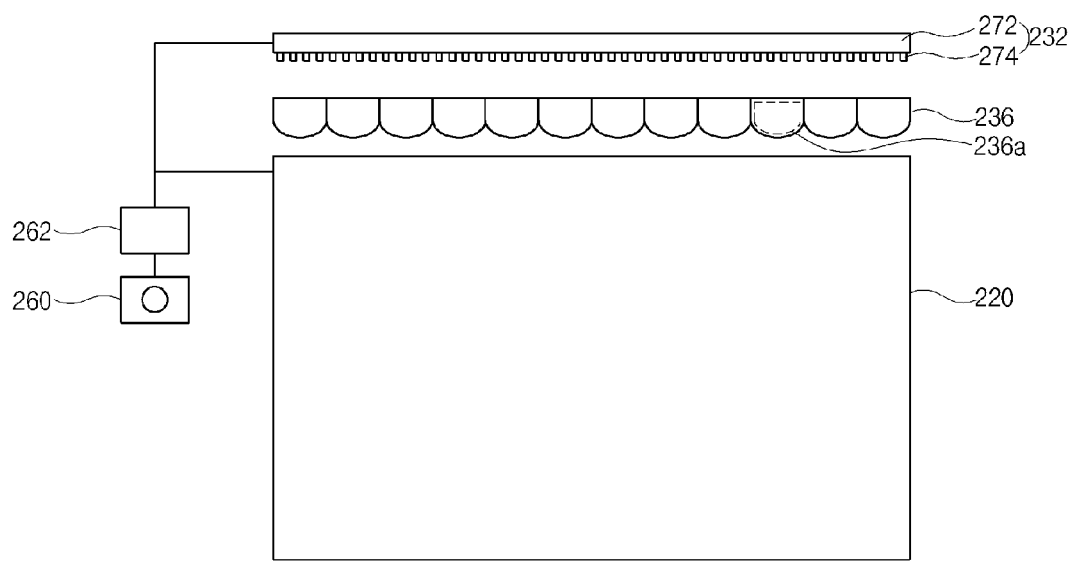
FIGS. 7A and 7B are a plan view and a cross-sectional view, respectively, showing a display device including a line light source according to a second embodiment of the present invention.
Figure 7B:
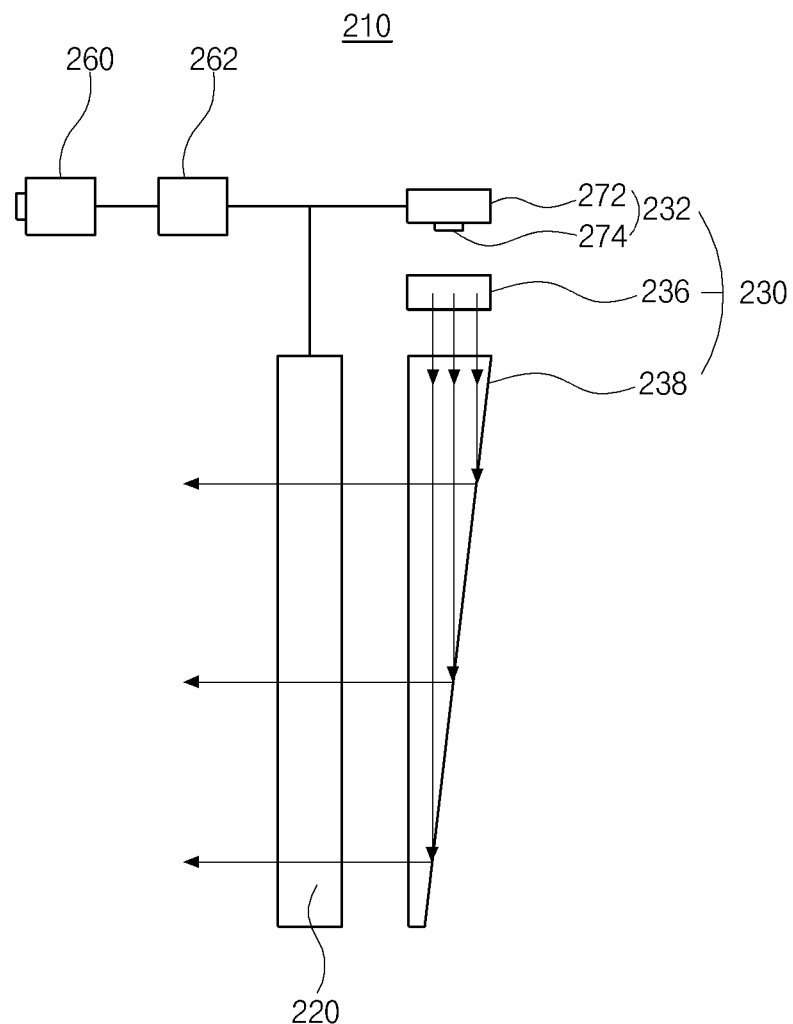

In another embodiment, a direction of a ray may be adjusted by selectively turning on a plurality of line light sources instead of using a ray adjusting part. FIGS. 7A and 7B are a plan view and a cross-sectional view, respectively, showing a display device including a line light source according to a second embodiment of the present invention.

In FIGS. 7A and 7B, a display device 210 according to a second embodiment of the present invention includes a display panel 220 for displaying an image, a backlight unit 230 for supplying a light to the display panel 220, a position sensing unit 260 for detecting a position of a user and a control unit 262 for controlling the display panel 220, the backlight unit 230 and the position sensing unit 260.

The display panel 220 includes a plurality of pixels (not shown), and at least one image signal may be inputted to the plurality of pixels during each of a plurality of sub-frames obtained by dividing a single frame in time division. For example, a transmissive type liquid crystal panel which includes two substrates facing into each other and a liquid crystal layer between the two substrates may be used to configure the display panel 220.

The backlight unit 230 includes a light source part 232 for emitting a ray, a lens array 236 for collimating the ray from the ray adjusting part 234 and a light guide plate 238 for changing a direction of the ray from the lens array 236 toward the display panel 220. The light source part 232 and the lens array 236 are disposed along a side of the light guide plate 238 and the light guide plate 238 is disposed under the display panel 220.

The light source part 232 includes a base substrate 272 and a plurality of line light sources 274 spaced apart from each other and mounted in a row on the base substrate 272. For example, a light emitting diode (LED), an organic light emitting diode (OLED) or a laser which emits a light toward a single direction may be used to configure the plurality of line light sources 274.

The lens array 236 includes a plurality of lenses 236a contiguously arranged and each of the plurality of lenses 236a has a semi-cylindrical shape. The plurality of line light sources 274 may correspond to one of the plurality of lenses 236a.

The light guide plate 238 is disposed such that an incident surface of the light guide plate 238 faces the lens array 236. The light guide plate 238 supplies a uniform linear ray to the display panel 220 by transmitting the ray from the lens array 236 due to several total reflections. For the purpose of perpendicularly changing the direction of the ray, the light guide plate 238 may have a front surface parallel to a horizontal surface and a rear surface slanted with respect to the horizontal surface, and a pattern having a predetermined shape may be formed on the rear surface of the light guide plate 238. For example, an ellipse pattern, a polygon pattern or a hologram pattern may be formed on the rear surface of the light guide plate 238, and the pattern may be formed by a printing method or a molding method.

The position sensing unit 260 obtains position information about a target position which a user or one of left and light eyes of the user is disposed in and the image of the display panel 220 is directed to. For example, a camera may be used to configure the position sensing unit 260.

The control unit 262 determines a kind of the image, a refraction degree of the ray and an emission timing of the ray according to the position information about the target position from the position sensing unit 260 and drives the display panel 220 and the light source part 232 according to contents of determination.

The control unit 262 may drive the plurality of line light sources 274 of the light source part 232 to emit the ray at a determined timing and may drive the display panel 220 to display a determined image. As a result, the determined image is transmitted to the user or one of the left and right eyes of the user in the target position at the determined timing.

Figure 8:
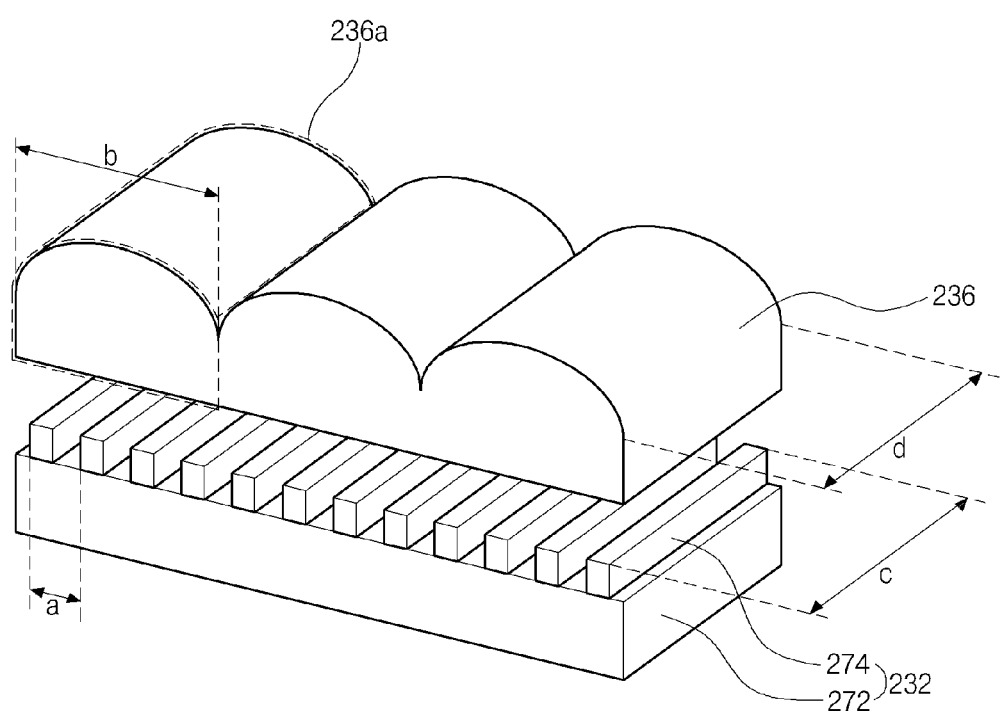
FIG. 8 is a perspective view showing a light source part and a lens array of a display device according to a second embodiment of the present invention.

The light source part 232 and the lens array 236 will be illustrated with reference to a drawing. FIG. 8 is a perspective view showing a light source part and a lens array of a display device according to a second embodiment of the present invention.

In FIG. 8, the light source part 232 includes the base substrate 272 and the plurality of line light sources 274, and the lens array 236 includes the plurality of lenses 236a. The plurality of line light sources 274 are spaced apart from each other and are mounted in a row on the base substrate 274.

A first pitch a between the adjacent line light sources 274 may be smaller than a second pitch b between the adjacent lenses 236a. For example, the second pitch b between the adjacent lenses 236a may be equal to or greater than twice of the first pitch a between the adjacent line light sources 274. The first and second pitches a and b may vary according to a property in display of a three-dimensional image.

In addition, a first height c of each of the plurality of line light sources 274 may be equal to a second height d of each of the plurality of lenses 236a. Further, a gap distance between the plurality of line light sources 274 and the plurality of lenses 236a may vary according to a property in display of a three-dimensional image.

The display device 210 according to the second embodiment of the present invention may be driven in various modes such as a two-dimensional mode, a three-dimensional mode and a multi-view mode by displaying first and second images of the display panel 220 in time division and by adjusting the direction of the ray due to sequential lighting of the plurality of line light sources 274 of the light source part 232.

During a first sub-frame which is a former half frame of a single frame, the display panel 220 displays the first image and a first one of the plurality of line light sources 274 corresponding to the plurality of lenses 236a of the lens array 236 is turned on. As a result, the ray is transmitted to a first viewing zone to display the first image at the first viewing zone.

During a second sub-frame which is a latter half frame of the single frame, the display panel 220 displays the second image and a second one of the plurality of line light sources 274 corresponding to the plurality of lenses 236a of the lens array 236 is turned on. As a result, the ray is transmitted to a second viewing zone to display the second image at the second viewing zone.

When the first and second images are the same as each other, the display device 210 is driven in a two-dimensional mode. When the first and second images are left and right images, respectively, the display device 210 is driven in a three-dimensional mode. In addition, when the first and second images are different from each other, the display device 210 is driven in a multi-view mode.

Figure 9A:
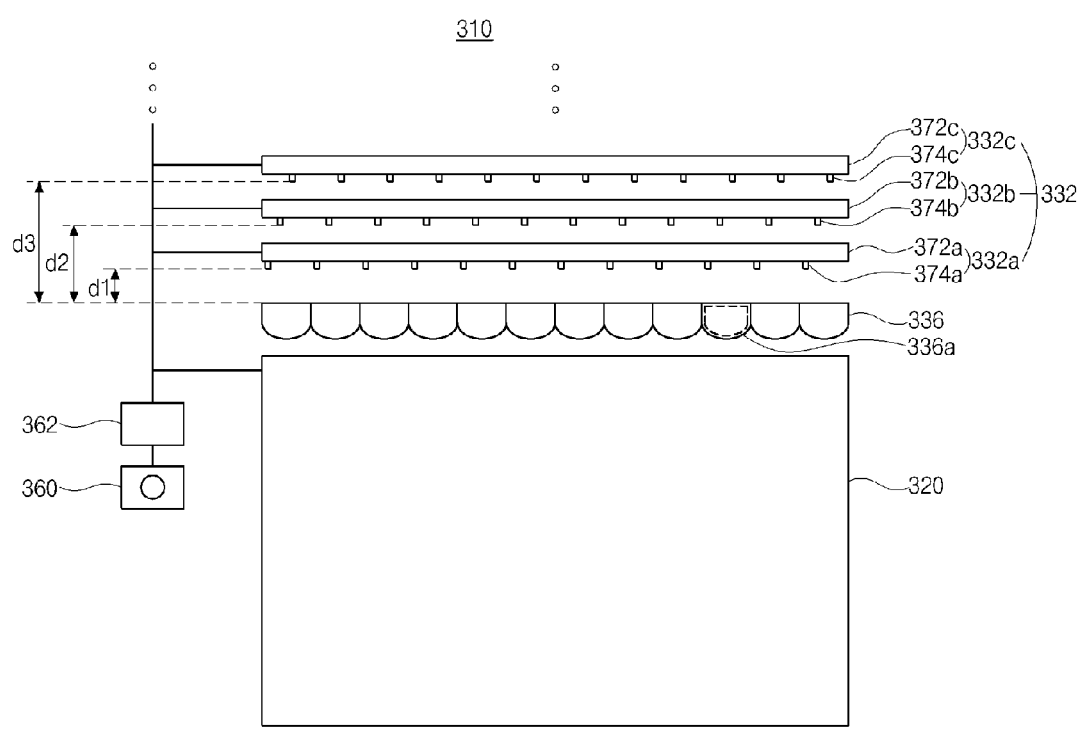
FIGS. 9A and 9B are a plan view and a cross-sectional view, respectively, showing a display device including a line light source according to a third embodiment of the present invention.
Figure 9B:
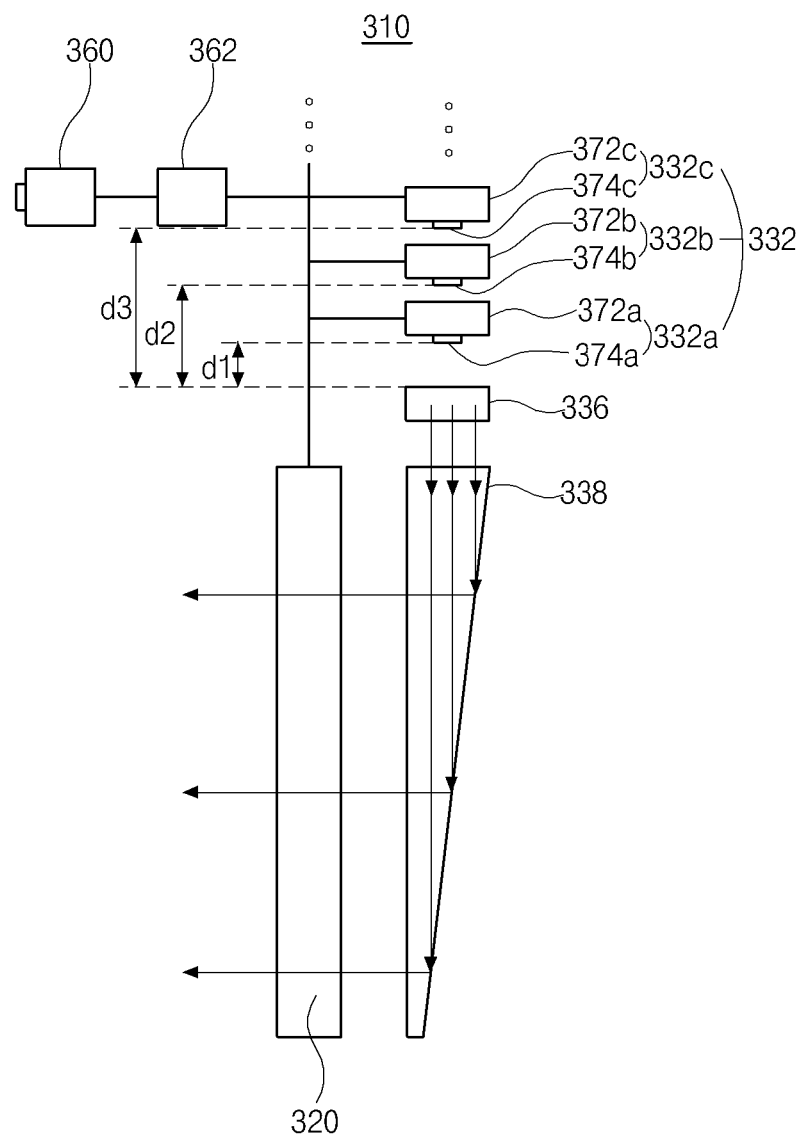

In another embodiment, a light source part may be formed to have a plurality of light source layers spaced apart from a lens array by different gap distances. FIGS. 9A and 9B are a plan view and a cross-sectional view, respectively, showing a display device including a line light source according to a third embodiment of the present invention.

In FIGS. 9A and 9B, a display device 310 according to a third embodiment of the present invention includes a display panel 320 for displaying an image, a backlight unit for supplying a light to the display panel 320, a position sensing unit 360 for detecting a position of a user and a control unit 362 for controlling the display panel 320, the backlight unit and the position sensing unit 360.

The display panel 320 includes a plurality of pixels (not shown), and at least one image signal may be inputted to the plurality of pixels during each of a plurality of sub-frames obtained by dividing a single frame in time division. For example, a transmissive type liquid crystal panel which includes two substrates facing into each other and a liquid crystal layer between the two substrates may be used to configure the display panel 220.

The backlight unit includes a light source part 332 for emitting a ray, a lens array 336 for collimating the ray from the light source part 332 and a light guide plate 338 for changing a direction of the ray from the lens array 336 toward the display panel 320. The light source part 332 and the lens array 336 are disposed along a side of the light guide plate 338 and the light guide plate 338 is disposed under the display panel 320.

The light source part 332 includes a plurality of light source layers 332a, 332b and 332c spaced apart from the lens array 336 by different gap distances. Each of the plurality of light source layers 332a, 332b and 332c includes a base substrate 372a, 372b and 372c and a plurality of line light sources 374a, 374b and 374c spaced apart from each other and mounted in a row on the base substrate 372a, 372b and 372c.

For example, a first light source layer 332a may be spaced apart from the lens array 336 by a first gap distance d1, a second light source layer 332b may be spaced apart from the lens array 336 by a second gap distance d2 greater than the first gap distance d1, and a third light source layer 332c may be spaced apart from the lens array 336 by a third gap distance d3 greater than the second gap distance d2. The first, second and third gap distances d1, d2 and d3 may be about 1.5 mm, about 1.6 mm and about 1.7 mm, respectively. In addition, a light emitting diode (LED), an organic light emitting diode (OLED) or a laser which emits a light toward a single direction may be used as the plurality of line light sources 374a, 374b and 374c.

The lens array 336 includes a plurality of lenses 336a contiguously arranged and each of the plurality of lenses 336a has a semi-cylindrical shape. Each of the plurality of lenses 336a may correspond to the plurality of line light sources 374a, 374b and 374c of the plurality of light source layers 332a, 332b and 332c. For example, each of the plurality of lenses 336a may correspond to a first line light source 374a of the first light source layer 332a, a second line light source 374b of the second light source layer 332b and a third line light source 374c of the third light source layer 332c.

Since the light source part 332 includes the plurality of light source layers 332a, 332b and 332c having different gap distances from the lens array 336, clear three-dimensional images are provided to the users at different positions from the display device 310. As a result, a viewing range of the display device 310 is enlarged.

The light guide plate 338 is disposed such that an incident surface of the light guide plate 338 faces the lens array 336. The light guide plate 338 supplies a uniform linear ray to the display panel 320 by transmitting the ray from the lens array 336 due to several total reflections. For the purpose of perpendicularly changing the direction of the ray, the light guide plate 338 may have a front surface parallel to a horizontal surface and a rear surface slanted with respect to the horizontal surface, and a pattern having a predetermined shape may be formed on the rear surface of the light guide plate 338. For example, an ellipse pattern, a polygon pattern or a hologram pattern may be formed on the rear surface of the light guide plate 338, and the pattern may be formed by a printing method or a molding method.

The position sensing unit 360 obtains position information about a target position which a user or one of left and light eyes of the user is disposed in and the image of the display panel 320 is directed to. For example, a camera may be used as the position sensing unit 360.

The control unit 362 determines a kind of the image, a refraction degree of the ray and an emission timing of the ray according to the position information about the target position from the position sensing unit 360 and drives the display panel 320 and the light source part 332 according to contents of determination.

The control unit 362 may drive the plurality of line light sources 374a, 374b and 374c of the light source part 332 to emit the ray at a determined timing and may drive the display panel 320 to display a determined image. As a result, the determined image is transmitted to the user or one of the left and right eyes of the user in the target position at the determined timing.

Figure 10:
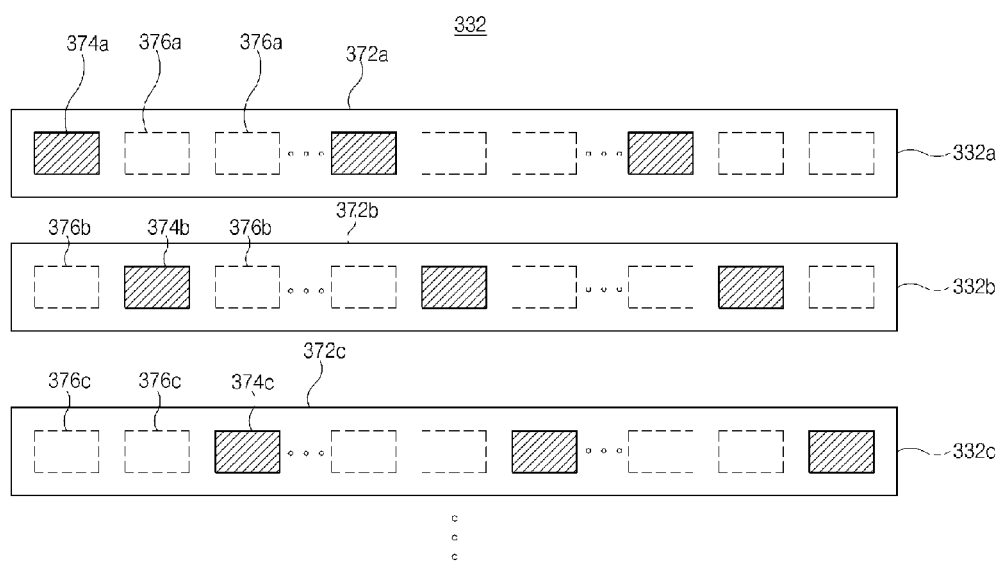
FIG. 10 is exploded plan view showing a light source part of a display device according to a third embodiment of the present invention.

The light source part 332 will be illustrated with reference to a drawing. FIG. 10 is exploded plan view showing a light source part of a display device according to a third embodiment of the present invention. The plurality of light source layers vertically overlapping each other are horizontally exploded in FIG. 10.

In FIG. 10, the light source part 332 of the display device 310 (of FIG. 9B) according to the third embodiment of the present invention includes the plurality of light source layers 332a, 332b and 332c spaced apart from the lens array 336 (of FIG. 9B) by different gap distances. Each of the plurality of light source layers 332a, 332b and 332c includes the plurality of line light sources 374a, 374b and 374c spaced apart from each other and mounted in a row on the base substrate 372a, 372b and 372c, and the base substrate 372a, 372b and 372c include a plurality of transmissive areas 376a, 376b and 376c between the plurality of line light sources 374a, 374b and 374c.

For example, the first light source layer 332a may include the plurality of first line light sources 374a mounted on the first base substrate 372a and the first base substrate 372a may include the plurality of first transmissive areas 376a between the plurality of first line light sources 374a. The second light source layer 332b may include the plurality of second line light sources 374b mounted on the second base substrate 372b and the second base substrate 372b may include the plurality of second transmissive areas 376b between the plurality of second line light sources 374b. In addition, the third light source layer 332c may include the plurality of third line light sources 374c mounted on the third base substrate 372c and the third base substrate 372c may include the plurality of third transmissive areas 376c between the plurality of third line light sources 374c.

The plurality of transmissive areas 376a, 376b and 376c of one of the plurality of base substrates 372a, 372b and 372c correspond to the plurality of line light sources 374a, 374b and 374c of the others of the plurality of base substrates 372a, 372b and 372c to transmit the ray from the plurality of line light sources 374a, 374b and 374c.

For example, the plurality of first transmissive areas 376a of the first base substrate 372a may allow the light emitted from the plurality of second line light sources 374b of the second base substrate 372b and the plurality of third line light sources 374c of the third base substrate 374c to pass through. The plurality of second transmissive areas 376b of the second base substrate 372b may allow the light emitted from the plurality of first line light sources 374a of the first base substrate 372a and the plurality of third line light sources 374c of the third base substrate 374c to pass through. In addition, the plurality of third transmissive areas 376c of the third base substrate 372c may allow the light emitted from the plurality of first line light sources 374a of the first base substrate 372a and the plurality of second line light sources 374b of the second base substrate 374b to pass through.

The plurality of transmissive areas 376a, 376b and 376c may be obtained by forming an opening in a portion of the plurality of base substrates 372a, 372b and 372c or by forming a transparent material (e.g., transparent plastic or transparent glass) in a portion of the plurality of base substrates 372a, 372b and 372c.

Figure 11:
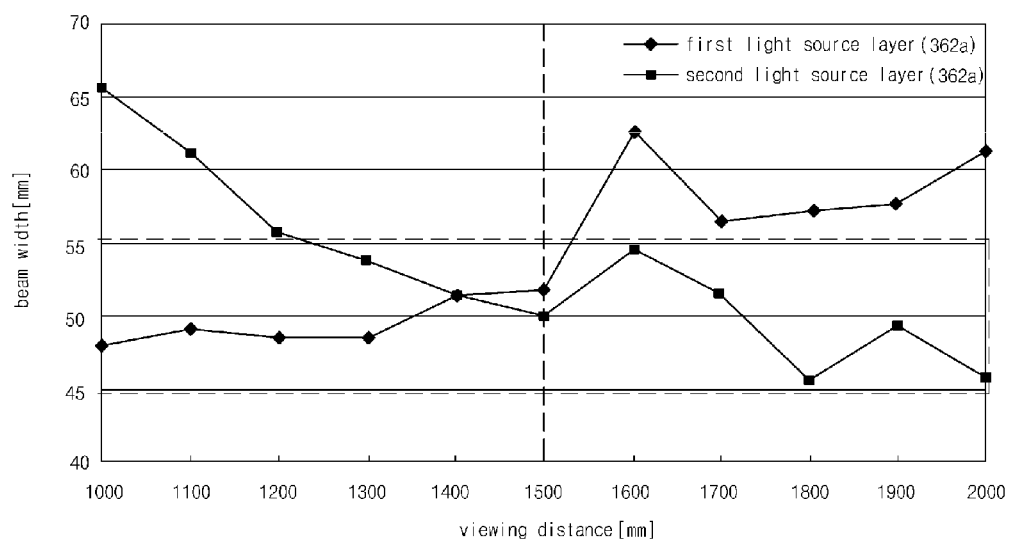
FIG. 11 is a graph showing a change of a beam width according to a viewing distance in a display device including a line light source according to a third embodiment of the present invention.

A change of a beam width according to a viewing distance in the plurality of light source layers disposed at different positions will be illustrated with reference to drawings. FIG. 11 is a graph showing a change of a beam width according to a viewing distance in a display device including a line light source according to a third embodiment of the present invention. A viewing distance is defined as a distance from the display device to the user and a beam width is defined as a width of the ray emitted from the line light source at a position of the user.

In FIG. 11, the ray emitted from the plurality of first line light sources 374a of the first light source layer 362a has the beam width within a range of about 48 mm to about 52 mm at the viewing distance within a range of about 1000 mm to about 1500 mm, while the ray has the beam width within a range of about 52 mm to about 63 mm at the viewing distance within a range of about 1600 mm to about 2000 mm.

The ray emitted from the plurality of second line light sources 374b of the second light source layer 362b has the beam width within a range of about 56 mm to about 65 mm at the viewing distance within a range of about 1000 mm to about 1200 mm, while the ray has the beam width within a range of about 45 mm to about 54 mm at the viewing distance within a range of about 1300 mm to about 2000 mm.

Here, it is considered that deterioration in display quality such as a three-dimensional crosstalk may be caused by both the left and right eye images entering one of the left and right eyes of the user. In considering such deterioration in display quality, the display device may be configured to determine that the display quality of the three-dimensional image is deteriorated when the beam width is out of a range of about 50 mm±5 mm. For example, the image may be displayed by turning on the plurality of first line light sources 374a of the first light source layer 362a when the user is positioned at the viewing distance smaller than about 1500 mm and the image may be displayed by turning on the plurality of second line light sources 374b of the second light source layer 362b when the user is positioned at the viewing distance equal to or greater than about 1500 mm. Accordingly, the three-dimensional image with suppressing the deterioration of the image quality may be displayed to the plurality of users at various viewing distances by using the ray having the beam width within a range of about 50 mm±5 mm. As a result, deterioration of the display quality such as a three-dimensional crosstalk is prevented and the viewing range of the display device 310 is enlarged.

Figure 12:
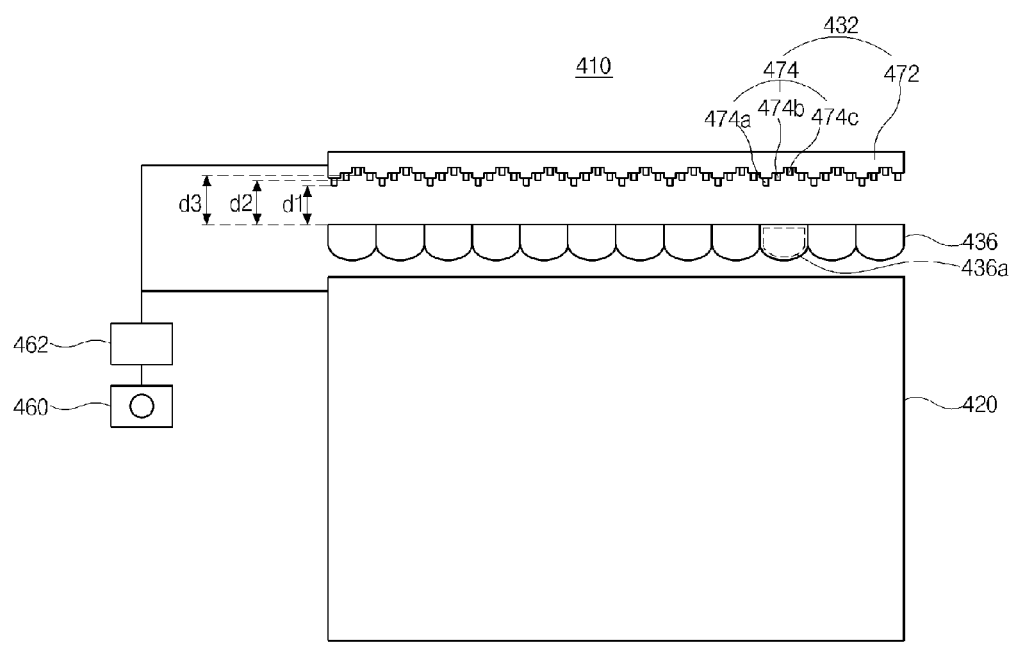
FIG. 12 is a plan view showing a display device according to a fourth embodiment of the present invention.

In another embodiment, a single light source part may include the plurality of line light sources having gap different distances. FIG. 12 is a plan view showing a display device according to a fourth embodiment of the present invention.

In FIG. 12, a display device 410 according to a fourth embodiment of the present invention includes a display panel 420 for displaying an image, a backlight unit for supplying a light to the display panel 420, a position sensing unit 460 for detecting a position of a user and a control unit 462 for controlling the display panel 420, the backlight unit and the position sensing unit 460.

The display panel 420 includes a plurality of pixels (not shown), and at least one image signal may be inputted to the plurality of pixels during each of a plurality of sub-frames obtained by dividing a single frame in time division. For example, a transmissive type liquid crystal panel which includes two substrates facing into each other and a liquid crystal layer between the two substrates may be used to configure the display panel 420.

The backlight unit includes a light source part 432 for emitting a ray, a lens array 436 for collimating the ray from the light source part 432 and a light guide plate for changing a direction of the ray from the lens array 436 toward the display panel 420. The light source part 432 and the lens array 436 are disposed along a side of the light guide plate and the light guide plate is disposed under the display panel 420.

The light source part 432 includes a base substrate 472 and a plurality of line light sources 474a, 474b and 474c spaced apart from each other and mounted in a row on the base substrate 472. The plurality of line light sources 474a, 474b and 474c are spaced apart from the lens array 436 by different gap distances.

The base substrate 472 includes a plurality of layers having different heights due step differences of a stair shape, and the plurality of line light sources 474a, 474b and 474c are formed on the plurality of layers, respectively.

For example, a first line light source 474a may be formed on a first layer which is spaced apart from the lens array 436 by a first gap distance d1, a second line light source 474b may be formed on a second layer which is spaced apart from the lens array 436 by a second gap distance d2 greater than the first gap distance d1, and a third line light source 474c may be formed on a third layer which is spaced apart from the lens array 436 by a third gap distance d3 greater than the second gap distance d2. The first, second and third gap distances may be about 1.5 mm, about 1.6 mm and about 1.7 mm, respectively. In addition, for example, a light emitting diode (LED), an organic light emitting diode (OLED) or a laser which emits a light toward a single direction may be used to configure the plurality of line light sources 474a, 474b and 474c.

The lens array 436 includes a plurality of lenses 436a contiguously arranged and each of the plurality of lenses 436a has a semi-cylindrical shape. Each of the plurality of lenses 436a may correspond to the plurality of line light sources 474a, 474b and 474c. For example, each of the plurality of lenses 436a may correspond to the first, second and third line light sources 474a, 474b and 474c.

Since the light source part 432 includes the plurality of line light sources 474a, 474b and 474c having different gap distances from the lens array 436, clear three-dimensional images are provided to the users at different positions from the display device 410. As a result, a viewing range of the display device 410 is enlarged.

Figure 13:
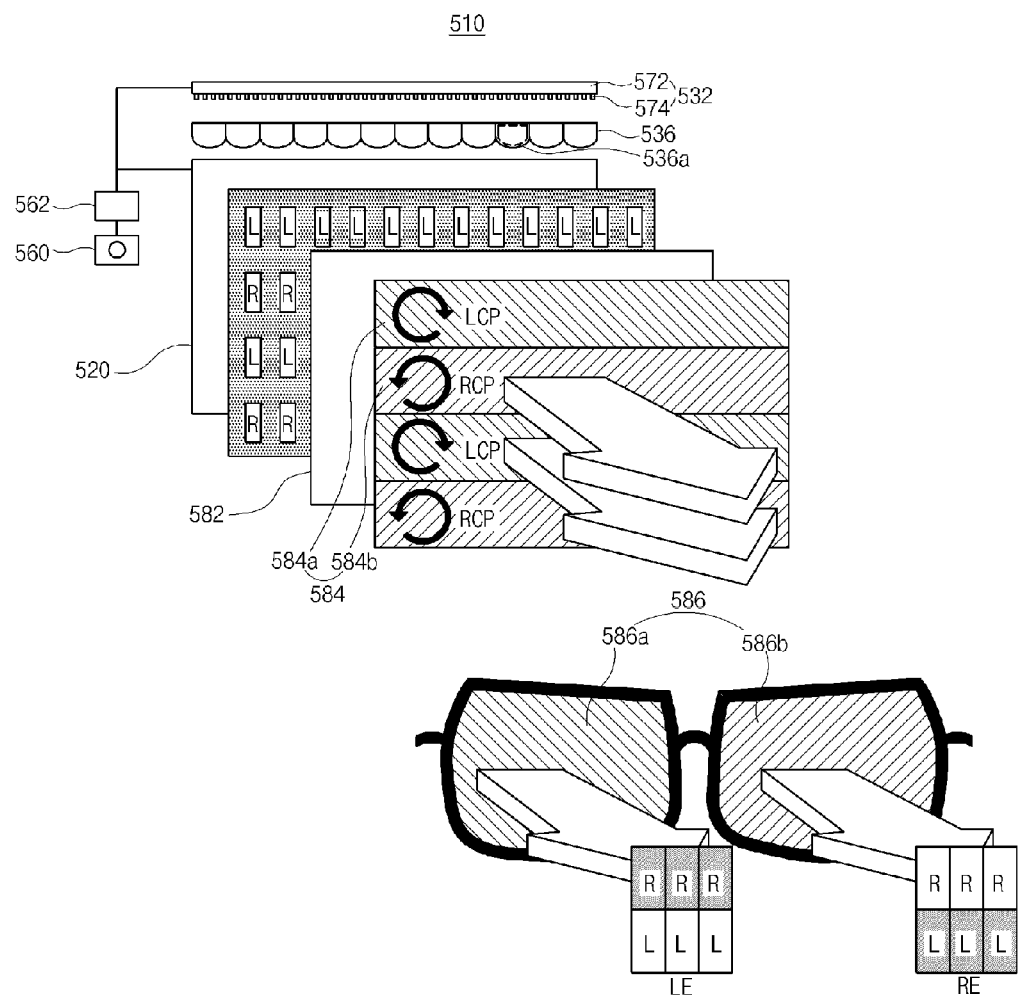
FIG. 13 is a view showing a display device including a line light source according to a fifth embodiment of the present invention.

In another embodiment, a three-dimensional image may be displayed in a glasses type or glasses-free type by disposing a polarizing plate and a patterned retarder are disposed over the display device. FIG. 13 is a view showing a display device including a line light source according to a fifth embodiment of the present invention.

In FIG. 13, a display device according to a fifth embodiment of the present invention includes a display panel 520 for displaying an image, a backlight unit for supplying a light to the display panel 520, a position sensing unit 560 for detecting a position of a user, a control unit 562 for controlling the display panel 520, the backlight unit and the position sensing unit 560, a polarizing plate 582 over the display panel 520 and a patterned retarder 584 over the polarizing plate 582.

The display panel 520, the backlight unit, the position sensing unit 560 and the control unit 560 have the same structure as the display panel 220, the backlight unit 230, the position sensing unit 260 and the control unit 262 of the display device 210 according to the second embodiment of the present invention of FIGS. 7A and 7B.

The display panel 520 includes a plurality of pixels (not shown), and at least one image signal may be inputted to the plurality of pixels during each of a plurality of sub-frames obtained by dividing a single frame in time division. For example, a transmissive type liquid crystal panel which includes two substrates facing into each other and a liquid crystal layer between the two substrates may be used to configure the display panel 520.

The backlight unit includes a light source part 532 for emitting a ray, a lens array 536 for collimating the ray from the ray adjusting part 534 and a light guide plate for changing a direction of the ray from the lens array 536 toward the display panel 220. The light source part 532 and the lens array 536 are disposed along a side of the light guide plate and the light guide plate is disposed under the display panel 520.

The light source part 532 includes a base substrate 572 and a plurality of line light sources 574 spaced apart from each other and mounted in a row on the base substrate 572. For example, a light emitting diode (LED), an organic light emitting diode (OLED) or a laser which emits a light toward a single direction may be used as the plurality of line light sources 574.

The lens array 536 includes a plurality of lenses 536a contiguously arranged and each of the plurality of lenses 536a has a semi-cylindrical shape. The plurality of line light sources 574 may correspond to one of the plurality of lenses 536a.

The polarizing plate 582 converts left and right images displayed by the display panel 520 into linearly polarized left and right images and transmits the linearly polarized left and right images to the patterned retarder 584. The patterned retarder 584 includes left and right retarders 584*a* and 584*b* which are alternately disposed along a vertical direction of the display panel 520. Polarization glasses 586 which are worn by the user include a left lens 586*a* transmitting a left circularly polarized light and a right lens 586*b* transmitting a right circularly polarized light.

In the image transmitted to the user, the left eye image which is left circularly polarized is transmitted to the left eye of the user through the left lens 586*a* and the right eye image which is right circularly polarized is transmitted to the right eye of the user through the right eye lens 586*b*. Accordingly, the user may perceive a three-dimensional image by combining the left and right images transmitted to the left and right eyes, respectively.

The display device 510 according to the fifth embodiment of the present invention may be driven in various modes of a glasses-free type such as a two-dimensional mode, a three-dimensional mode and a multi-view mode by displaying the first and second images of the display panel 520 in time division and by adjusting the direction of the ray due to sequential lighting of the plurality of line light sources 574 of the light source part 532.

In addition, the display device 510 according to the fifth embodiment of the present invention may be driven in various modes of a glasses type such as a two-dimensional mode and a three-dimensional mode by displaying the first and second images of the first and second horizontal lines of the display panel 520 in time division and by transmitting the first and second images of the first and second horizontal lines to the left and right eyes of the user wearing the polarization glasses 586.

In the display device according to the present disclosure, consequently, since an edge type backlight unit including a line light source and a lens array is used and a display panel and the edge type backlight unit are driven in time division, a two-dimensional image and a three-dimensional image are displayed without reduction in resolution. In addition, since the edge type backlight unit includes only a few line light sources, the number of light sources is reduced.

It will be apparent to those skilled in the art that various modifications and variations can be made in a display device including a line light source and a method of driving the display device of the present disclosure without departing from the spirit or scope of the invention. Thus, it is intended that the present invention covers the modifications and variations of this invention provided they come within the scope of the appended claims and their equivalents.

What is claimed is:

1. A display device, comprising:
   a display panel configured to display a plurality of images at a plurality of viewing zones in time division;
   a light guide plate under the display panel;
   a lens array at an edge surface of the light guide plate, the lens array including a plurality of lenses;
   a light source part including a plurality of line light sources each configured to emit a respective ray toward the lens array, the lens array being on an optical path of the rays between the light source part and the light guide plate;
   a position sensing unit configured to obtain a position information about the plurality of viewing zones; and
   a control unit configured to control the display panel, the light source part, and the position sensing unit, according to the position information,
   wherein each lens, among the plurality of lenses, has a same height and shape, and
   wherein, at a predetermined time, the ray respectively emitted from each of the plurality of line light sources enters a respective single lens among the plurality of lenses.

2. The device according to claim 1, further comprising:
   a ray adjusting part between the light source part and the lens array,
   wherein the ray adjusting part includes a plurality of electrowetting devices for adjusting a direction of the ray.

3. The device according to claim 2, wherein each of the plurality of electrowetting devices includes:
   first and second substrates facing and spaced apart from each other;
   a first electrode on end portions of an inner surface of the first substrate;
   second and third electrodes respectively formed on end portions of an inner surface of the second substrate, each of the second and third electrodes having a trapezoid shape with slanted inner side surfaces in cross-section view, the slanted inner side surfaces of the second and third electrodes facing into each other and having an area greater than an area of top surfaces of the second and third electrodes;
   a first insulating layer of a hydrophobic insulating material on the slanted inner side surfaces and the top surfaces of the second and third electrodes;
   a second insulating layer between the first insulating layer and the second and the first electrodes, the first and second substrates, the first electrode, the first insulating layer, and the second insulating layer defining a space; and
   a water layer and an oil layer in the space, an interface surface being defined between the water layer and the oil layer,
   wherein the electrowetting device is configured such that, when a same voltage is applied to the second and third electrodes, the interface surface is parallel with an incident surface of the light guide plate, and
   wherein, when different voltages are applied to the second and third electrodes, the interface surface is slanted with respect to the incident surface of the light guide plate.

4. The device according to claim 2, wherein one of the plurality of electrowetting devices:
   corresponds to one of the plurality of line light sources; and
   corresponds to one of the plurality of lenses.

5. The device according to claim 1, wherein:
   the light source part includes a plurality of light source layers spaced apart from the lens array by different gap distances; and
   each of the plurality of light source layers includes:
   a base substrate; and
   a plurality of line light sources spaced apart from each other on the base substrate.

6. The device according to claim 5, wherein the base substrate includes a plurality of transmissive areas between the plurality of line light sources.

7. The device according to claim 6, wherein:
   the plurality of line light sources of each of the light source layers are in a row; and surfaces of the light source layers including the plurality of line light sources are parallel to each other, the rows of line light sources thereby being parallel to each other.

8. The device according to claim 1, wherein:
the light source part includes:
a base substrate having a plurality of layers of a stair shape; and
a plurality of line light sources spaced apart from the lens array by different gap distances; and
each light source among the plurality of line light sources is respectively formed on the plurality of layers.

9. The device according to claim 8, wherein:
the plurality of layers includes at least three layers; and
the plurality of line light sources are spaced apart from the lens array by at least three different gap distances.

10. The device according to claim 9, wherein the three different gap distances are respectively about 1.5 mm, 1.6 mm, and 1.7 mm.

11. The device according to claim 1, further comprising:
a polarizing plate over the display panel; and
a patterned retarder over the polarizing plate, the patterned retarder including left and right retarders alternately disposed along a vertical direction of the display panel.

12. The device according to claim 1, wherein a pitch between the plurality of lenses is equal to or greater than twice of a pitch between the plurality of line light sources.

13. The device according to claim 1, wherein, at a predetermined timing, the plurality of rays respectively emitted from the plurality of line light sources are all transmitted to a single viewing zone, among the plurality of viewing zones, according to the position information.

14. A method of driving a display device, the method comprising:
obtaining a position information about a plurality of viewing zones by a position sensing unit; controlling a light source part, such that a ray respectively emitted from each of a plurality of line light sources of the light source part passes through a lens array and a light guide plate and is sequentially transmitted to the plurality of viewing zones, the lens array being on an optical path of the ray between the light source part and the light guide plate, the lens array being disposed at an edge surface of the light guide plate; and
displaying a plurality of images at the plurality of viewing, zones in time division by a display panel using the ray,
wherein the lens array includes a plurality of lenses,
wherein each lens, among the plurality of lenses, has a same height and shape, and
wherein, at a predetermined time, the ray respectively emitted from each of the plurality of line light sources enters a respective single lens among the plurality of lenses.

15. The method according to claim 14, wherein:
controlling the light source part comprises:
transmitting the ray to a first viewing zone by turning on a first line light source of the plurality of line light sources during a first sub-frame that is a former half of a single frame; and
transmitting the ray to a second viewing zone by turning on a second line light source of the plurality of line light sources during a second sub-frame that is a latter half of the single frame; and
displaying the plurality of images in time division comprises:
displaying a first image by the display panel during the first sub-frame; and
displaying a second image by the display panel during the second sub-frame.

16. The method according to claim 14, wherein:
the light source part includes a plurality of light source layers spaced apart from the lens array by different gap distances;
controlling the light source part comprises:
transmitting the ray to a first viewing zone by turning on a first line light source on a first light source layer of the plurality of light source layers during a first sub-frame that is a former half of a single frame; and
transmitting the ray to a second viewing zone by turning on a second line light source on a second light source layer of the plurality of light source layers during a second sub-frame that is a latter half of the single frame; and
displaying the plurality of images in time division comprises:
displaying a first image by the display panel during the first sub-frame; and
displaying a second image by the display panel during the second sub-frame.

17. A display device, comprising:
a display panel configured to display a plurality of images at a plurality of viewing zones in time division;
a light guide plate under the display panel;
a lens array disposed along a side of the light guide plate, the lens array including a plurality of lenses;
a light source part including a plurality of line light sources configured to emit a plurality of rays toward the lens array, at least two of the plurality of line light sources being respectively disposed under each one of the plurality of lenses;
a position sensing unit configured to obtain a position information about the plurality of viewing zones; and
a control unit configured to control the display panel, the light source part, and the position sensing unit, according to the position information,
wherein each lens, among the plurality of lenses, has a same height and shape, and
wherein, at a predetermined time, the ray respectively emitted from each of the plurality of line light sources enters a respective single lens among the plurality of lenses.

18. The device according to claim 17, wherein a pitch between the plurality of lenses is equal to or greater than twice of a pitch between the plurality of line light sources.

19. The device according to claim 17, wherein:
the light guide plate has an incident surface, a top surface, and a rear surface; and
the light source part and the lens array face the incident surface of the light guide plate.

20. The device according to claim 19, wherein the plurality of rays from the light source part are transmitted to the incident surface of the light guide plate through the lens array.

21. The device according to claim 19, wherein the plurality of rays from the light source part are transmitted to a plurality of portions of the display panel.

* * * * *